United States Patent [19]

Marwick et al.

[11] 4,370,298

[45] Jan. 25, 1983

[54] CONTAINED FISSION EXPLOSION BREEDER REACTOR SYSTEM

[76] Inventors: Edward F. Marwick, 5149 Morse Ave., Skokie, Ill. 60077; Nis H. Juhl, 5405 Wallbridge, Midland, Mich. 48640

[21] Appl. No.: 64,824

[22] Filed: Aug. 8, 1979

Related U.S. Application Data

[63] Continuation-in-part of Ser. No. 544,178, Jan. 27, 1975, abandoned.

[51] Int. Cl.³ ............................................... G21C 1/00
[52] U.S. Cl. ..................................... 376/317; 376/914
[58] Field of Search ................... 176/39; 376/317, 914

[56] References Cited

U.S. PATENT DOCUMENTS

| | | | |
|---|---|---|---|
| 4,121,969 | 10/1978 | Marwick | 176/39 |
| 4,121,971 | 10/1978 | Marwick | 176/39 |
| 4,216,058 | 8/1980 | Marwick | 176/39 |

*Primary Examiner*—Sal Cangialosi
*Attorney, Agent, or Firm*—Nis H. Juhl

[57] ABSTRACT

A reactor system for producing useful thermal energy and valuable isotopes, such as plutonium-239, uranium-233, and/or tritium, in which a pair of sub-critical masses of fissile and fertile actinide slugs are propelled into an ellipsoidal pressure vessel. The propelled slugs intercept near the center of the chamber where the concurring slugs become a more than prompt configuration thereby producing a fission explosion. Re-useable accelerating mechanisms are provided external of the vessel for propelling the slugs at predetermined time intervals into the vessel. A working fluid of lean molten metal slurry is injected into the chamber prior to each explosion for the attenuation of the explosion's effects, for the protection of the chamber's walls, and for the absorbtion of thermal energy and debris from the explosion. The working fluid is injected into the chamber in a pattern so as not to interfere with the flight paths of the slugs and to maximize the concentration of working fluid near the chamber's center. The heated working fluid is drained from the vessel and is used to perform useful work. Most of the debris from the explosion is collected as precipitate and is used for the manufacture of new slugs.

20 Claims, 5 Drawing Figures

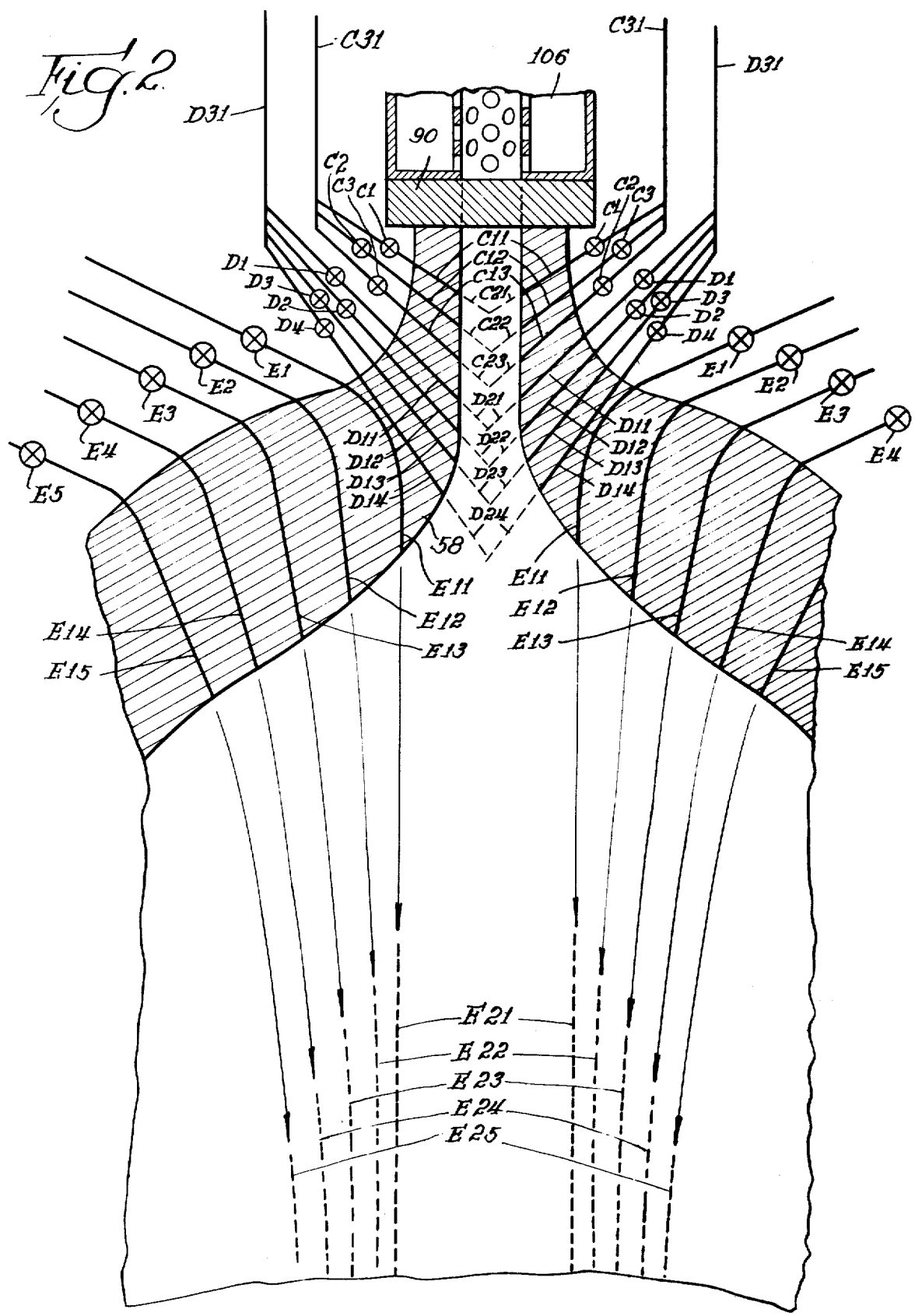

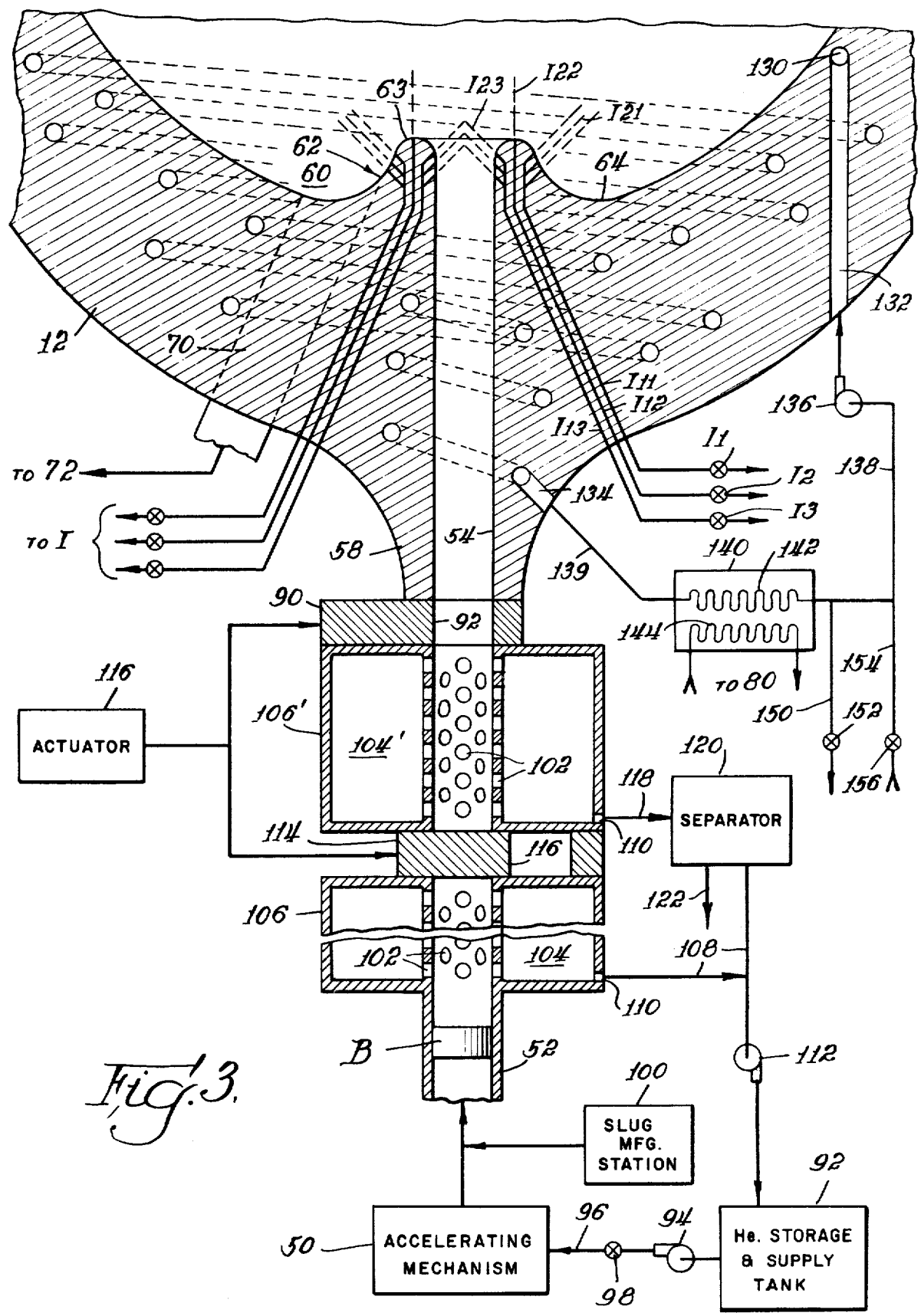

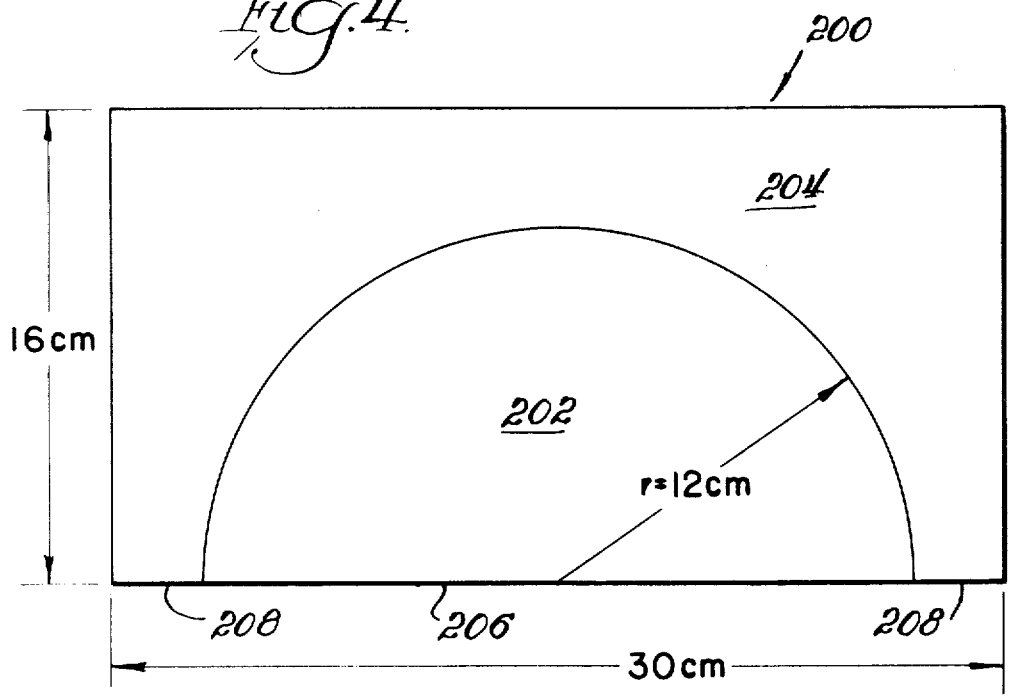
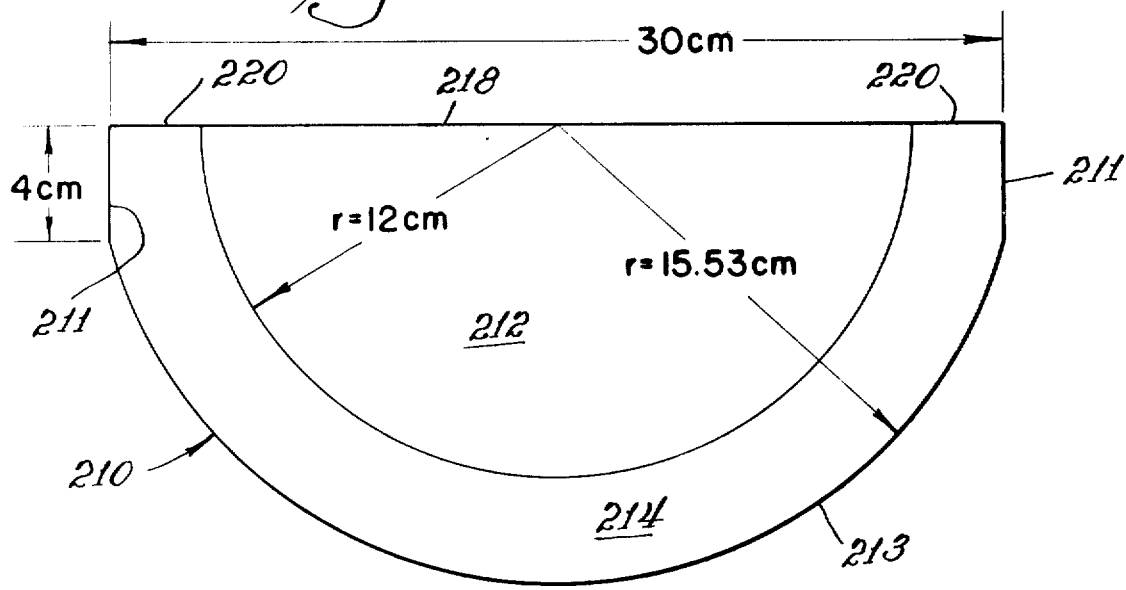

CONTAINED FISSION EXPLOSION BREEDER REACTOR SYSTEM

BACKGROUND OF THE INVENTION

This is a continuation-in-part of U.S. patent application Ser. No. 544,178 filed Jan. 27, 1975 by Edward F. Marwick and Nis H. Juhl, now abandoned.

The present invention resides in a breeder reactor system for producing thermal energy and valuable isotopes by exploding a plurality of sub-critical masses of fissile and fertile actinide slugs within an ellipsoidal pressure vessel. A molten metal working fluid is injected into the vessel prior to the explosion and the heated working fluid is thereafter drained from the vessel for use in generating electric power or for pumping.

Various proposals have been made for exploding pellets of a nuclear fuel within an explosion containing vessel and in which the fuel is ignited by means of an intense laser pulse.

One type of thermo-nuclear fusion reactor has been described in U.S. Pat. No. 3,624,239, issued to Arthur P. Fraas on Nov. 30, 1971. In this type of reactor pellets of frozen thermo-nuclear fuel of Deuterium-Tritium are periodically and singly injected into a central void of a body of liquid lithium which is circulated in a pressure vessel. Each pellet is bombarded with an intense laser pulse to produce a fusion reaction, thereby heating the lithium. The heated lithium is then conveyed to a heat exchanger and tritium recovery system after which the lithium is conveyed back to the pressure vessel.

Another proposal for laser ignition of a pellet of Deuterium-Tritium in a pressure vessel is disclosed in U.S. Pat. No. 3,762,992, issued on Oct. 2, 1973 to Hedstrom. In this laser driven fusion reactor, a thick blanket containing lithium is provided in the pressure vessel to convert the fast neutron energy from the thermo-nuclear explosion into heat and into tritium fuel. The reactor employs a solid wall to separate the reaction cavity from the lithium blanket. Protection of the reactor's "first wall" is provided by a thin layer of ablative lithium, which, as it vaporizes, absorbs the energy of radiation and impact.

Additional proposals are set forth in "Transactions" of the American Nuclear Society (TANSAO 18-1-401) of June 23-27, 1974 in which the author A. D. Krubein discusses laser ignited fission-fusion micro-explosions in containment chambers.

Various designs of fission-fusion blanketed explosion devices which are injected into a pressure vessel for producing thermal energy and valuable isotopes are also disclosed in Edward F. Marwick U.S. patent application Ser. No. 268,864, filed July 3, 1972; Ser. No. 284,086, filed Aug. 28, 1972; Ser. Nos. 308,978, 308,979, and 308,980, all filed on Nov. 24, 1972; Ser. No. 325,005, filed Jan. 19, 1973; and Ser. Nos. 355,015 and 355,016, both filed on Apr. 27, 1973.

U.S. Application Ser. No. 268,863 more particularly, discloses the concept of exploding blanketed nuclear devices in a pressure vessel having an atmosphere of carbon dioxide. Radioactive debris produced by the explosion, including valuable isotopes, are collected at the bottom of the vessel while steam is produced outside of the chamber for the production of useful work.

U.S. Application Ser. No. 308,978, more specifically, discloses a tubular shaft for photon ignition by means of a laser of a nuclear explosive device within non-transparent fluids. U.S. Application Ser. No. 308,979, more specifically, discloses a lens system for concentrating laser energy onto a nuclear explosive device.

The difficulty in the construction of the various types of nuclear fission-fusion reactors thus far proposed, resides in the problem of igniting the projectiles or pellets by means of laser generated photon pulses. Calculations have shown that the critical mass of a fissionable assembly can be reduced by laser implosion techniques to such a degree that a fission micro-explosion becomes possible. However, even the largest lasers in operation today are not yet powerful enough to generate the ultra-high pressures needed to implode the pellet material into a heated plasma state to cause a fusion reaction. Thus, the sort of short-pulsed, very intense laser for generating the ultra-high temperature plasma needed to initiate "burning" of the fuel has not been developed and efforts to scale up present generation of lasers are not proceeding as rapidly as planners had hoped. The task of heating the nuclear fuel to a sufficiently high temperature at the required density so that it will begin to "burn" has proven to be much more difficult than anticipated. Once the fuel is ignited, the hot, dense, gaseous mixture of ions must be held together for a time long enough so that more energy is liberated through "burning" than is invested in the ignition process.

Serious problems have also been encountered in the timing of generating a laser pulse and in the alignment of a laser such that a laser pulse will intercept a pellet at the desired position as a pellet is injected into a pressure vessel. Any timing error or misalignment in the direction of the laser pulse will thus result in the failure of obtaining "ignition" of a pellet thereby wasting great amounts of energy used in the operation of the laser and in the fabricating cost of the pellets.

Accordingly, laser induced thermo-nuclear microexplosions for the economic production of thermal energy and fissile isotopes are not yet within the reach of present day technology.

The present invention provides an alternative to controlled fission reactors which are in operation today as well as to the various types of fission, fusion, or fission-fusion reactors in which nuclear projectiles or pellets are ignited by laser generated photon pulses.

SUMMARY OF THE INVENTION

The present invention overcomes the foregoing problems in providing a reactor system capable of containing an essentially unlimited number of successive fission explosions within an ellipsoidal pressure vessel. The fission explosion is produced by propelling a pair of slugs or pellets, each containing a sub-critical mass of actinides into the vessel. The slugs intercept near the center of the vessel to produce the explosion as the combining masses become more than critical.

A major portion of a working fluid is allowed to flow under gravity into the pressure vessel so that a major portion of the working fluid is concentrated in a somewhat spherical pattern around the combining slugs near the center of the vessel and without interfering with the movement of the slugs as they enter the vessel through barrel openings provided in the vessel. A minor portion of the working fluid is sprayed into the vessel to protect the barrel openings at the instant of the explosion and to cool and protect the wall of the pressure vessel.

The slugs are propelled into the pressure vessel by means of reuseable accelerating mechanisms positioned externally of the vessel.

The working fluid, heated by the explosion, is drained from the pressure vessel and is used to perform useful work. The debris produced by the exploding slugs, including fissile and fertile isotopes, is collected as a precipitate from the working fluid and is fabricated into additional slugs. Other isotopes such as $Pu^{239}$ and Tritium produced in the reactor system are useful in other reactors. Tritium decays into $He^3$ which is suitable as a reactor control gas in todays atomic reactors or as a fuel in fusion reactions.

A neutron absorbing fluid or slurry is pumped through a passageway within the wall of the pressure vessel to provide additional protection to the integrity of the wall and to lessen fissionings near the wall.

Movable closure mechanism are provided to allow access of the slugs into the pressure vessel while preventing the working fluid and other radioactive material and gases from escaping from the vessel into the slug accelerating mechanisms. Solid materials and gases are evacuated from the vessel and are separated for reuse or disposal.

BRIEF DESCRIPTION OF THE DRAWINGS

FIG. 2 is an enlarged cross-sectional view of the top portion of the vessel.

FIG. 3 is an enlarged cross-sectional view of the bottom portion of the vessel including a detailed cross-sectional view of a closure mechanism (somewhat schematical).

FIG. 4 is a cross-sectional view of one of a pair of mirror-image slugs.

FIG. 5 is a cross-sectional view of another embodiment of one of a pair of mirror-image slugs.

DESCRIPTION OF PREFERRED EMBODIMENT

Figure 1:
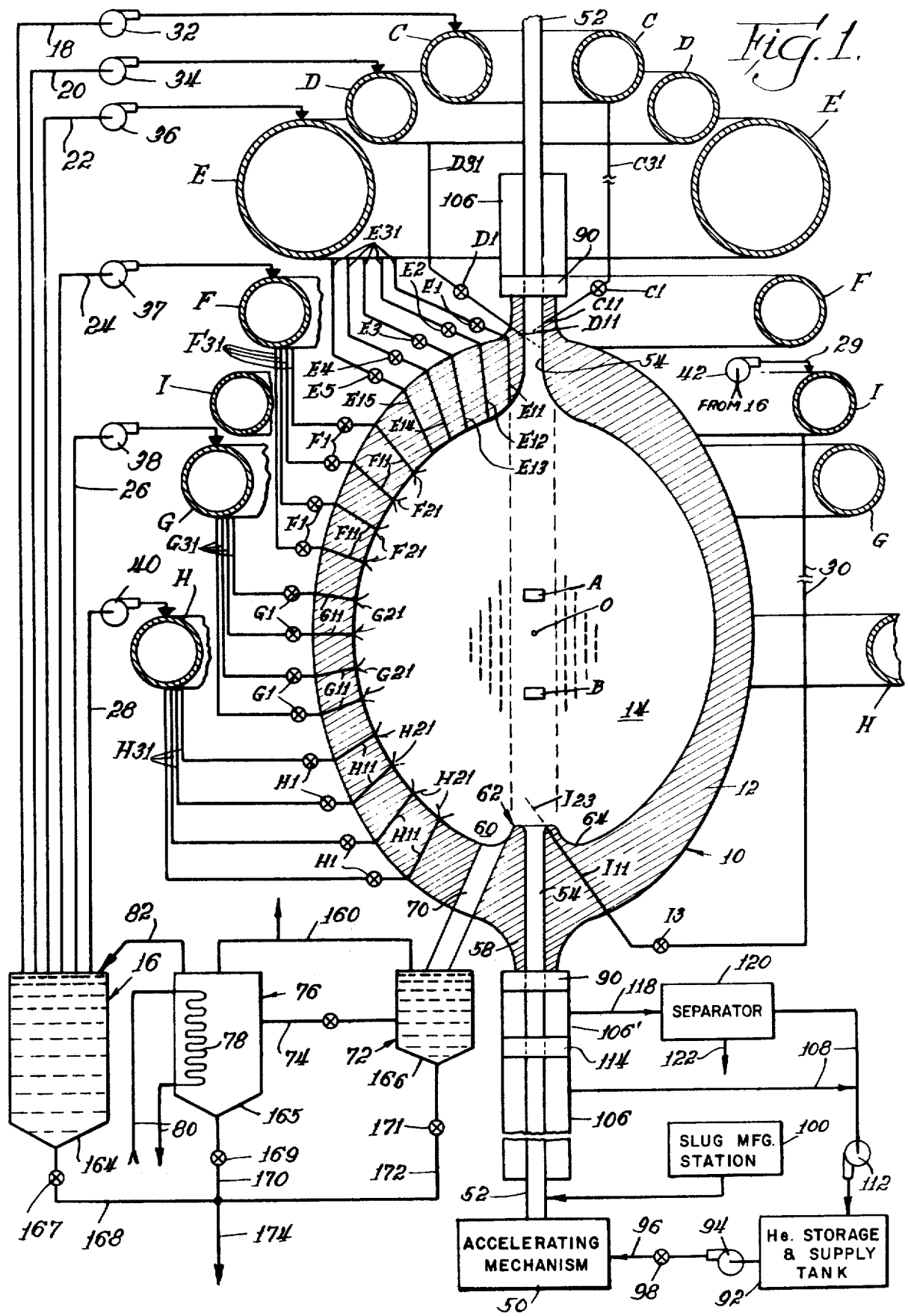
FIG. 1 is a somewhat schematic cross-sectional view of a nuclear reactor system in which are illustrated a pair of slugs approaching interception near the center of an ellipsoidal pressure vessel.

The following detailed description of the invention is intended to convey a clear understanding of the inventive concept but will be understood to be exemplary of other embodiments not specifically illustrated or described but within the scope of the invention as particularly set forth in the accompanying claims.

Referring now to FIG. 1, there is illustrated a reactor system comprising a pressure vessel 10 in the shape of an ellipsoid having a substantially elliptically-shaped, in cross-section, wall 12 which forms an explosion chamber 14 for the containment of a series of fission explosions taking place at predetermined time intervals near the center O of the chamber. A vessel having the shape of an ellipsoid is preferred as it is best suited for containment of a nuclear explosion fireball which expands substantially spherically outwardly and which has a tendency to rise upwardly towards the top of the chamber.

The pressure vessel must, of course, be absolutely safe and capable of withstanding the effects of a virtually unlimited number of fission explosions. More specifically, the vessel must be constructed of metals or metal alloys capable of withstanding severe conditions of blast, thermal shock, and chemical corrosion. The feasibility of constructing such a vessel for the containment of a series of explosions each having an energy release of about 100 tons of TNT, has been discussed as an eminently feasible project by R. J. Burke ANR Report (ENG-CTR TM-31).

In the reactor system of the present invention, the shock and blast effects from each explosion are attenuated by injection of a quantity of a working fluid into the chamber immediately prior to each explosion. A liquid metal, preferably molten sodium, is used since, among sodium's many advantages, are its excellent heat transfer properties and the fact that its boiling point is high enough to allow the pressure vessel to operate at relatively low vapor pressures. In addition, sodium is a poor neutron moderator and has a low neutron capture cross-section. It is also contemplated to use lithium as the working fluid in the reactor system of the present invention since lithium has about three times the heat capacity per unit mass as does sodium. Accordingly, only about one-third as much power would be needed for pumping and recirculating lithium through the system as compared to molten sodium. Moreover, lithium has a much lower vapor pressure as compared to sodium so that there would be less alkali metal vapor produced within the chamber after each explosion. Working fluids, other than alkali metals, such as molten metals or alloys of lead, bismuth, magnesium, or tin can also be used. It would also be possible, with minor modifications, to use compounds such as sodium hydroxide as a working fluid in the reactor of this invention.

The working fluid not only serves the purpose of protecting the vessel from the blast of the explosion but it also provides a carrier medium for the thermal energy generated by the explosion. Thus, the vessel must be constructed to withstand the blast effects of the working fluid as it is pushed outwardly with great impulse from the center of the vessel by the explosion to impact against the vessel wall. The vessel must also be designed to withstand a succession of thermal shocks which are produced as the wall is alternately heated and cooled by the working fluid. Specifically, as the working fluid is heated by an explosion, some of the thermal energy is transferred to the wall to thereby heat the wall. After the heated working fluid is withdrawn from the vessel, the wall is cooled again by the introduction of a quantity of cooler working fluid into the chamber immediately prior to the next explosion.

The wall of the vessel must also be constructed of a material capable of resisting the chemically corrosive effects of the working fluid at a temperature of about 500° C. Stainless clad, carbon steel or steel alloys such as are presently used in the manufacture of pressure vessels for conventional nuclear reactors are suitable for the construction of the pressure vessel of this invention. Other steel and steel alloys capable of resisting the thermal shocks in the reactor system of the present invention may be those presently used in the manufacture of gun barrels, or in the cylinders of diesel engines. Other metals such as Niobium, Molybdenum, Titanium, Tantalum, Tungsten, or alloys of such metals can be used as a cladding material since they have good physical properties and are highly resistant to the chemically corrosive effects of the working fluid. The selection of materials best suited for the construction of the pressure vessel, conduits, and the like, does not form a part of this invention, however.

A supply system is provided which is particularly adapted for the introduction of the working fluid into the pressure vessel to obtain maximum attenuation of a fission explosion with a minimum detrimental effect on the integrity of the wall of the pressure vessel. It is estimated that it will be necessary to inject approximately 140 metric tons, if sodium is used, of the working fluid into the vessel for attenuating each explosion that has an energy release equivalent to about $4 \times 10^{10}$ joules. Accordingly, the supply system includes a reservoir 16 which is constructed of a size capable of containing about 200 metric tons of working fluid.

A plurality of auxiliary reservoirs C,D,E,F,G,H, and I are provided to supply the working fluid to select areas of the chamber. Thus, the auxiliary reservoir C is connected to the main reservoir 16 by means of a conduit 18. A high pressure pump 32 is provided in the conduit for continuously supplying working fluid to the auxiliary reservoir C. A branch conduit $C_{31}$ is connected to the bottom of the auxiliary reservoir and to a passageway $C_{11}$ extending through the wall of the vessel. A valve $C_1$ is provided in the branch conduit $C_{31}$ to interrupt the flow of working fluid to the passageway $C_{11}$, on demand. Although only one branch conducts $C_{31}$, valve $C_1$ and passageway $C_{11}$ is shown in FIG. 1, it will be understood that a greater number of the passageways $C_{11}$ extend at spaced intervals through the wall 12 and circumferentially around the vessel so as to form a circular row of passageways. As more clearly shown in FIG. 2, a plurality of rows of passageways $C_{11}$, $C_{12}$ and $C_{13}$ are preferably provided. The rows of passageways also extend at spaced intervals from the top of the vessel so that the uppermost portion of the vessel is provided with a multiplicity of spaced passageways for injection of the working fluid into the chamber. The auxiliary reservoir C is positioned at an elevation of about 20 meters above the vessel for delivering the working fluid at a relatively high pressure to the uppermost portion of the vessel and, more specifically, for delivering the working fluid immediately in front of the barrel opening 54.

As in the case of the first auxiliary reservoir C, a second auxiliary reservoir C is continuously supplied with working fluid from the reservoir 16 through a main supply conduit 20 and high pressure pump 34. A branch conduit $D_{31}$ is connected to the bottom of the second auxiliary reservoir D for supplying working fluid to a passageway $D_{11}$ extending through the wall of the vessel. A valve $D_1$ is provided in the branch conduit $D_{31}$ to interrupt the flow of working fluid to the passageway, on demand. As more clearly illustrated in FIG. 2, a plurality of rows of circumferentially extending passageways $D_{11}$-$D_{14}$, are provided. Each branch conduit is provided with a valve $D_1$-$D_4$ to interrupt the flow of working fluid to each passageway, on demand. The second auxiliary reservoir is positioned at an elevation of about 6 meters above the passageways to provide working fluid to the passageways at a pressure which is somewhat lower than the pressure in passageways $C_{11}$-$C_{13}$.

A third auxiliary reservoir E is connected by means of a main supply conduit 22 to the main reservoir 16. A high pressure pump 36 is connected in the main supply conduit to continuously supply working fluid to the third auxiliary reservoir. As shown in FIGS. 1 and 2, a plurality of circumferentially extending rows of passageways $E_{11}$-$E_{15}$ extend through the wall of the vessel and each passageway is supplied with working fluid through a branch conduit $E_{31}$ connected to the bottom of the third auxiliary reservoir E. A valve $E_1$-$E_5$ is provided in each branch conduit to supply working fluid to each of the passageways, on demand. The third auxiliary reservoir is positioned at an elevation of about 3 meters above the passageways $E_{11}$-$E_{15}$.

Additional auxiliary reservoirs F, G and H are provided to supply working fluid through passageways $F_{11}$, $G_{11}$ and $H_{11}$, respectively, and in the form of a spray, shown at $F_{21}$, $G_{21}$ and $H_{21}$, to the chamber. Each of the auxiliary reservoirs F, G and H is connected to the main reservoir 16 by means of main supply conduits 24, 26 and 28. A high pressure pump 37, 38 and 40 is connected in each of the main supply conduits for continuously supplying working fluid to each of the auxiliary reservoirs F, G and H. Each of the auxiliary reservoirs F, G and H is also provided with branch conduits $F_{31}$, $G_{31}$ and $H_{31}$ connected to each of the passageways $F_{11}$, $G_{11}$, and $H_{11}$, respectively. A valve $F_1$, $G_1$ and $H_1$ is connected in each branch conduit to interrupt the flow of working fluid to each of the passageways, on demand.

The auxiliary reservoirs F, G and H provide working fluid at relatively low pressure to the rows of passageways $F_{11}$, $G_{11}$ and $H_{11}$ and, accordingly, these reservoirs are positioned about 2 meters above their respective rows of passageways. The passageways $F_{11}$, $G_{11}$ and $H_{11}$ extend over a major arcuate portion of the chamber wall and inject the working fluid part way into the chamber prior to an explosion in the form of a fan or cone shaped spray, shown at $F_{21}$, $G_{21}$ and $H_{21}$. The low pressure spray from the passageways $F_{11}$, $G_{11}$ and $H_{11}$ is primarily intended for protecting the wall of the chamber from the effects of the explosion, but it also has the additional beneficial effect of cooling the wall of the vessel to maintain the temperature of the wall at a substantially constant temperature to thereby minimize thermal shocks to the wall.

The auxiliary reservoir I is provided to supply working fluid, under relatively high pressure, to the bottom portion of the vessel and especially in front of the barrel opening 54. A main supply conduit 29 is connected to the main reservoir 16 and a high pressure pump 42 is connected in the main supply conduit 29 for continuously supplying the working fluid from the main reservoir to the auxiliary reservoir I. A branch conduit 30 is connected between the auxiliary reservoir I and each of the passageways extending through the wall of the vessel for supplying working fluid to the passageways. A valve is connected in each branch conduit 30 to interrupt the flow of working fluid to the passageway on demand. As more clearly illustrated in FIG. 3, three circumferential rows of passageways $I_{11}$, $I_{12}$ and $I_{13}$ are provided to supply the working fluid as a spray $I_{21}$, $I_{22}$ and $I_{23}$ in a select area at the bottom of the vessel. Each branch conduit is controlled by a valve $I_1$, $I_2$ and $I_3$ to interrupt the flow of working fluid, on demand.

The passageways associated with the auxiliary reservoirs C, D, and I each have a diameter of about 1 cm. and occupy about 40% of the volume of the wall through which they extend. Thus, when viewed from the inside of the vessel, the openings provided by the passageways $C_{11}$-$C_{13}$ and $D_{11}$-$D_{14}$ will occupy about 40% of the area over which they extend. The passageways associated with the auxiliary reservoir E each have a diameter of about 2 cm and occupy about 60% of the volume of the wall portion through which they extend. The passageways associated with the auxiliary reservoirs F, G, and H each have a diameter of about 1 cm. and occupy about 20% of the volume of the wall portion through which they extend.

Relatively small amounts of the working fluid are supplied to the passageways from each of the auxiliary reservoirs C, D, F, G, H and I so that these reservoirs can be constructed of a relatively small size. Since auxiliary reservoir E, however, will supply as much as 70% of the working fluid to the chamber, this reservoir will be constructed of relatively larger size capable of holding about 100 metric tons of the working fluid.

The auxiliary reservoirs can be constructed in the form of toroidal chambers centrally positioned with respect to a central longitudinal axis extending vertically through the center of the vessel. Alternatively, the auxiliary reservoirs can be constructed as cylindrically shaped vessels or containers positioned at circumferentially spaced intervals of 60° to 120° around the vessel. However, for maximum utilization of space, it is preferred to construct the auxiliary reservoirs as toroidal chambers mounted at spaced intervals from the top to the bottom of the vessel.

A pair of slugs A and B are illustrated in FIG. 1 as they move toward each other for interception near the center 0 of the vessel. It is preferred to have the slugs intercept at a point slightly below the center in view of the tendency of the fireball from the explosion to rise towards the top of the chamber. Since the vessel is designed to contain fission explosions equivalent to about 9.5 tons of TNT, the chamber 14 has a major internal radius of about 12 meters along a vertical axis and a minor internal radius of about 10 meters along a horizontal axis. The greatest amount of attenuation to the explosion will be obtained when the working fluid is as closely concentrated near the point of interception of the two slugs, as possible. Thus, a slight variation in the point of interception of the slugs above or below the intended point of interception is not critical and would merely result in a slight decrease in the degree of attenuation of the explosion.

The nearer the center of concurrence, which is the center of fissioning, of a pair of slugs is to the geometric center of the concentrated working fluid, the greater will be the magnitude of the resulting explosion. This is because the atoms of the concentrated working fluid act somewhat as neutron reflectors. Since the working fluid is a slurry which contains fissile actinides and other actinides which may fission to faster neutrons some neutrons will be generated within this spray. Likewise, if the concurrence of slugs is "off center" the resulting explosion will be of smaller magnitude.

A pair of accelerating mechanism 50, only one of which is shown in FIGS. 1 and 3, are provided at diametrically opposite ends of the vessel for propelling the slugs A and B into the vessel. Each accelerating mechanism is designed to propel a slug through a barrel or passageway 52 and through a barrel opening 54 provided in the vessel 10 into the chamber 14. A closure mechanism, which will be described in greater detail in connection with FIG. 3, is provided between the barrel 52 and the barrel opening 54 for sealing the barrel opening and the chamber at the instant of an explosion. Accordingly, the closure mechanism must be constructed to prevent leakage of radioactive solid and gaseous materials from the chamber at all times, to prevent contamination of the surrounding area.

It is particularly desirable to protect each barrel opening 54 and closure mechanism from the effects of the explosions and, accordingly, the working fluid is preferably concentrated as a spray immediately in front of each barrel opening. Since the auxiliary reservoir C is located at an elevation of about 20 meters above the passageways $C_{11}$–$C_{13}$, the static pressure acting on the working fluid will force the working fluid through the passageways at great pressure.

It is also desirable to prevent the working fluid from impinging upon a slug as it passes out of the barrel opening 54 into the chamber and as it moves toward the center of the chamber. Since the slug travels at a speed of about 50 to 300 m/sec. only a very short time interval is available for injecting the working fluid from the first auxiliary reservoir C in front of the barrel opening from the instant that a slug leaves the barrel opening. Thus, the working fluid may additionally be placed under positive pressure by providing a pressure pump in each branch conduit $D_{31}$ upstream of the valve $D_1$ to force the working fluid in front of the barrel opening at the instant that the slug passes out of the barrel opening into the chamber 14.

To provide additional protection to the closure mechanism, the vessel is also provided with an elongated neck 58 at the upper and lower ends of the vessel which has the effect of lengthening the barrel openings 54 to about 3 to 4 meters to thereby increase the distance that a shock wave from an explosion must travel. Thus, the blast from the explosion is substantially reduced as it travels outwardly from the center of the chamber toward the wall of the vessel and into the barrel openings 54.

An innermost row of passageways $E_{11}$ connected to the third auxiliary reservoir E extend vertically through the wall and surround the major vertical axis of the vessel to provide an inner curtain $E_{21}$ of working fluid which falls through the chamber and which has a somewhat tubular shape extending from the top to the bottom of the chamber. The inner curtain therefor forms a somewhat tubular passage for the slugs A and B having an inner radius from the center of the chamber of about 40 cm. Although only the innermost row of passageways $E_{11}$ are shown to provide the tubular curtain $E_{21}$, it is to be understood that a plurality of concentric rows of such vertically oriented passageways may be used to provide the tubular curtain of working fluid of somewhat greater thickness and density. In other words, a plurality of concentric rows of passageways extending over a radial distance of from 40 to 50 cm. from the central longitudinal axis may be utilized in the formation of the tubular curtain. The valves $E_1$ which control the flow of working fluid forming the inner tubular curtain are activated over a longer time interval as compared to the remaining valves $E_2$–$E_5$ so that the inner tubular curtain is allowed to extend over the entire length of the chamber along the major vertical axis of the vessel before an explosion takes place.

Successive rows of the passageways $E_{12}$–$E_{15}$, outwardly of the innermost row of passageways $E_{11}$, are under the control of the valves $E_2$–$E_5$ to provide a plurality of concentric tubularly shaped curtains $E_{22}$–$E_{25}$ of the falling working fluid which are of a shorter length than the innermost curtain $E_{21}$ or which are preferably of a gradually decreasing length the greater the radial distance of the rows of passageways $E_{12}$–$E_{15}$ from the major longitudinal axis of the vessel. The effect of the concentric curtains is such that at the instant of the explosion preferably about 70 to 80% of the working fluid is concentrated near the center of the chamber and in a somewhat spherical pattern, somewhat as illustrated in FIG. 1. Stated in another way, the concentric tubular curtains of falling working fluid are of a progressively shorter length from an innermost curtain to the outermost curtain to thus form a somewhat spherical pattern of the working fluid closely adjacent to the center of the vessel and to the point of interception of the slugs.

The radial distance of the outermost row of passageways $E_{15}$ is located about 4.5 to 5 meters from the major longitudinal axis of the vessel. However, to provide for a greater concentration of the working fluid around an exploding pair of slugs, the passageways $E_{12}$-$E_{15}$, with the exception of the vertical passageways $E_{11}$, are inclined slightly inwardly toward the center 0 of the chamber 14 so that with the outer row of passageways $E_{15}$ having an inclination which is slightly greater than the inclination of the inner row of passageways $E_{12}$. Accordingly, the falling curtains $E_{22}$-$E_{25}$ have a tendency to fall inwardly toward the inner curtain $E_{21}$, to thereby converge upon the inner curtain somewhat as illustrated in FIGS. 1 and 2. The converging curtains form a denser mass of the working fluid at the center of the chamber to thereby increase the degree of attenuation to the explosion and to form the spherical pattern produced at the center of the chamber around the inner curtain $E_{21}$ with the spherical pattern having an outer radius of about $3\frac{1}{4}$ meters from the center of the chamber to the outer tubular curtain $E_{15}$.

In order to produce the spherical pattern of the working fluid at the center of the chamber, it is necessary to activate the valves $E_1$-$E_5$ in a sequence whereby the innermost valves $E_1$ are activated first and for the longest time interval to permit the working fluid to flow through the passageways $E_{11}$ for a duration long enough to form the vertical tubular curtain extending along the entire length of the vessel immediately prior to the explosion. Thus, the innermost valves $E_1$ are activated first followed in sequence by the valves $E_2$ to $E_5$ in each concentric row outwardly of the innermost row of valves $E_1$. Each succeeding row of valves from the outermost to the innermost rows of valves are thereafter closed to complete the formation of the tubular curtains $E_{22}$ to $E_{25}$ of gradually decreasing length. The valves $E_5$ in the outermost row are therefor open for the shortest duration of time to thereby form the relatively short tubular curtain $E_{25}$ of working fluid.

For purposes of illustration, only five concentric rows of the passageways $E_{11}$-$E_{15}$ are shown in FIGS. 1 and 2. It will be understood, however, that a greater number of rows of passageways may be provided to assure that between 70-80% of the working fluid flows through the passageways to be concentrated at the center of the vessel at the instant of an explosion. In terms of volume, this means that about 70 to 80 tons of working fluid, if sodium is used, will be concentrated in less than 3% of the total volume of the chamber. These values can be suitably adjusted if, for example, it is desired to supply a greater amount of the working fluid near the chamber walls from the reservoirs F, G and H. This can be accomplished by actuating the valves $F_1$, $G_1$ and $H_1$ for a longer duration of time while the valves $E_1$-$E_5$ are actuated for a shorter duration of time to thereby provide a smaller amount of the working fluid of perhaps 50-60% or 50-60 tons to the center of the chamber.

Although the auxiliary reservoirs F, G and H have a static head of only about 2 meters, the valves $F_1$, $G_1$ and $H_1$ can be activated for a longer time period if it is desired to provide an increased attenuation to the explosion as well as an increase in the cooling of the wall 12.

The passageways $F_{11}$, $G_{11}$ and $H_{11}$ are generally directed towards a point slightly above the center of the vessel.

In view of the relatively large number of passageways which are concentrated at the top and at the bottom of the vessel, it is necessary to provide additional strength to the top and bottom portions of the vessel. Accordingly, the wall 12 is formed of a gradually increasing thickness from a central horizontal portion of the vessel where the wall is about 1 meter thick, towards the upper and lower ends of the vessel where the wall is about twice as thick, or about 2 meters. The total number of passageways in the vessel is dependent upon the diameter of each passageway and on the pressure of the working fluid flowing through the passageways. Accordingly, the larger the diameter of each passageway and the greater the pressure of the working fluid, the greater the amount of working fluid which will be injected into the chamber over a given period of time.

The lower portion of the vessel, illustrated in FIG. 3, forms a circular collection through or sump 60 for the collection and drainage of the heated working fluid from the chamber 14 after each explosion. A projection 62 extending inwardly into the chamber along the major vertical axis of the vessel is provided to prevent the flow of working fluid into the barrel opening 54. The barrel opening 54 extends centrally through the projection 62 so that the mouth of the barrel opening, formed as a rounded surface 63 on the projection, is positioned at a distance of about 1 to 2 meters above a bottom surface 64 of the trough, as shown. Except for a relatively small amount of the working fluid which is sprayed immediately in front of the barrel opening 54, the greater portion of the working fluid from the tubular shaped curtains $E_{21}$-$E_{25}$ will surround the projection 62 without the working fluid actually falling into the barrel opening 54.

The projection 62 must be protected from the effects of the explosions and, for this purpose, the passageways $I_{13}$-$I_{15}$ extend into the projection where they terminate in the rounded surface 63, as shown in FIG. 3. The working fluid flows through the passageways $I_{13}$ only during the short time interval that a slug travels from the mouth of the barrel opening 54 to the point of interception near the center O of the chamber. Since the outwardly and upwardly directed spray, shown at $I_{21}$ and $I_{22}$ do not intercept the flight path of a slug, the valves $I_1$ and $I_2$ can be opened for a longer period of time and before a slug leaves the barrel opening 54. Accordingly, the passageways $I_{11}$ and $I_{12}$ could be connected to the auxiliary reservoir H which would provide working fluid to these passageways at a static pressure of only about 7 meters which would be sufficient to supply an adequate quantity of the working fluid to the projection 62 at the instant of an explosion.

A plurality of outlet passageways 70 extend from the bottom surface 64 of the trough 60 through the wall 12 for continuously draining the working fluid from the chamber. Although only one passageway is shown in FIGS. 1 and 3, it will be understood that any number of such passageways can be provided as long as the passageways are of a size capable of draining all of the working fluid from the vessel between explosions. Five to nine working fluid outlet passageways are provided to obtain complete drainage of about 150 tons of the working fluid from the vessel between explosions. Of course, if only 3 passageways are provided, the passageways must be of a relatively large size. The spaces between each pair of outlet passageways 70 at the bottom surface 64 of the trough are provided with an inwardly sloping surface or with a crest, not shown, so that the working fluid will drain out of the trough into the passageways without leaving any pockets in which the working fluid can collect and which would cause a gradual build-up of radioactive debris in the pockets.

A major portion of the debris which is produced by the exploded slugs, and which is entrained within the working fluid, is passed out of the vessel and is partially separated from the working fluid in a catch basin 72 which is provided for each outlet passageway 70. Alternatively, a toroidally shaped catch basin is preferably provided extending horizontally around the lower portion of the vessel with all of the outlet passageways 70 connecting into the toroidal basin.

The working fluid, heated after each explosion, may be used to pump a liquid in a manner described in Application Ser. No. 383,828, filed on July 30, 1973 by Edward F. Marwick. Alternatively, the heated working fluid may be utilized in the generation of electric power. Neither method of performing useful work form a part of the present invention and are therefore not described in this application except insofar as to show how the heated working fluid is circulated through the reactor system. The working fluid is conducted out of the catch basin 72 through a conduit 74 and into a heat exchanger 76. A heat exchange fluid is passed, in indirect heat exchange relationship with the heated working fluid, through a heat exchange coil 78 positioned within the heat exchanger. Inlet and outlet conduits 80 are connected to the coil 78 and to a heat engine means which could drive an electric generator (not shown). A conduit 82 is connected between the heat exchanger 76 and the main reservoir 16 for conducting cooled working fluid to the main reservoir.

The closure mechanism for closing the lower barrel opening 54 is more clearly illustrated in FIG. 3. Since the closure mechanism at the top of the vessel is identical in construction it will not be described again. The closure mechanism may take the form of a hinged, single or double panel, trap door, or a shutter mechanism based on the principle of a camera shutter. It is preferred, however, to provide a closure mechanism consisting of a sliding or rotating plate having one or more openings. In the case of a rotating plate, the plate may be rotatably mounted on an axis offset from the central longitudinal axis of the vessel. Stepwise rotation of the plate would successively bring an opening in the plate into registration with the barrel opening 54 and the barrel 52. A main closure plate 90, which for purposes of simplicity is shown as a sliding plate, is shown in a position where an opening 92 is in alignment with the barrel opening 54 in the vessel.

Various means for propelling a slug into the chamber may be employed such as chemical explosives, for example, such as are commonly used for propelling projectiles through a gun barrel. However, most chemical explosives use oxygen compounded with nitrogen so that oxygen from the chemical explosion products, if introduced into the chamber, would readily combine chemically with an alkali metal working fluid, such as liquid sodium. The resulting oxide in the liquid sodium would make the working fluid extremely corrosive. Moreover, nitrogen from the chemical explosion products has a cross-section to slow neutrons of 1.88 barns and thus would absorb neutrons produced in the explosion and hence reduce the breeding ratio for breeding valuable isotopes in the reactor system of the present invention. If a slug accelerating medium such as hydrogen gas is used, problems would arise due to the fact that hydrogen forms hydrides with alkali metals and, at higher temperatures, the hydride formation is also extremely corrosive and could cause damage to some refractory metals used in the structural components of the system.

Another type of slug accelerating mechanism could employ a piston for compressing a quantity of gas in a compression chamber. The compressed gas is then suddenly released into the barrel to rapidly propel a slug through the barrel into the chamber.

Other types of accelerating mechanism could be of mechanical construction operating on the principle of a cross-bow or catapult. Any mechanically operated accelerating mechanism would have the advantage that it would not introduce extraneous matter into the chamber, such as solids or gases produced by chemical explosives.

In the preferred method a slug is accelerated by gas pressure in which a more suitable gas, such as helium would be used. The helium gas would be subject to the application of a controlled quantity of heat energy obtained by the discharge of an electric charge of predetermined intensity into a pressure chamber containing the helium gas under pressure. Instead of discharging an electric charge into the pressure chamber, the helium gas can also be rapidly heated by subjecting the gas to microwaves. By controlling the intensity of an electrical discharge from a capacitor, for example, or by controlling the intensity or duration of the microwaves, it is possible to obtain a fine control over the amount of heat energy supplied to the gas to thereby control the amount of pressure of the heated gas in the pressure chamber and ultimately the speed of a slug.

Since a plurality of slugs are simultaneously propelled into the chamber, an electrical control system, under the control of a computer can be provided to exercise accurate control over the acceleration of the slugs to assure that they will intercept at a predetermined speed near the center of the chamber. A slight variation in the speed of the slugs of about one meter per second would not be critical where the slugs are ultimately accelerated to velocities of about 50 to 300 m/sec. Calculations will show that a variation of about one meter per second in the speed of the slugs would mean that the slugs would intercept only a few centimeters above or below the intended point of interception in the chamber. Moreover, the vessel is constructed of sufficient strength and with a safety factor capable of withstanding explosions which are several times greater in intensity than the intensity of explosions contemplated in the present invention.

The use of helium gas as a propellent is well within the present state of the art since, over the last few years, much work has been done in the development of high-velocity gas guns. Such guns could readily be adapted for use in propelling the slugs of the present invention. Reference is made to one development in this field by J. D. Watson in "A Summary of the Development of Large Explosion Guns for Re-Entry Simulation" (AD-720394; PIFR155) in which the author describes a program to develop an explosive gun capable of launching large saboted models to re-entry velocities. Saboted lithium-magnesium models of up to 4.5 inches in diameter were launched successfully to a speed of 4.8 km/sec.

A velocity record was also established by accelerating a 2-gram cylindrical projectile to a velocity of 12.2 km/sec.

Another high velocity gas gun development is described by the authors G. R. Fowles et al., in "The Review of Scientific Instruments" Vol. 41, No. 7 of July, 1970.

The slug accelerating mechanism 50 is intended to be of the type for rapidly heating and expanding a quantity of helium gas within an expansion chamber. Alternatively, one extreme end portion of the barrel 52 itself could form an expansion chamber for the helium gas. The size of the expansion chamber behind the slug can be designed to take into account slugs of different weights or slugs which are accelerated to a particular desired velocity. Moreover, the amount of pressure of the gas in the expansion chamber and the intensity of the electrical discharge can also be varied to accelerate a slug to the desired velocity. A helium storage and supply tank 92 is provided to supply a predetermined quantity of the helium gas to the expansion chamber in the accelerating mechanism or, alternatively, directly to the expansion chamber in the end portion of the barrel 52. The helium gas is supplied to the accelerating mechanism at the desired pressure by means of a pump 94 positioned in conduit 96 connecting the storage tank 92 to the accelerating mechanism 50. A check valve 98 is provided in the conduit 96 to close the conduit as soon as a predetermined quantity of the helium gas has been supplied to the accelerating mechanism.

The slugs which are formed of a sub-critical mass of compressed actinides are manufactured in a slug manufacturing station 100 and conveyed into the breech (not shown) of the barrel 52. The insertion of a slug into the breech of the barrel must take place rapidly if it is desired to produce an explosion every 5 to 10 seconds. Several mechanisms for accomplishing this are briefly described, but since such mechanisms are well known in the art and do not form any part of this invention, they are not specifically illustrated in the drawings. One mechanism for rapidly injecting a slug into the breech may be a pusher mechanism for injecting a slug through an opening in the breech. The opening can be closed and sealed by means of a hinged or sliding panel on the barrel. Alternatively, a revolver-type magazine can be provided which is rotatably mounted around the barrel and which has a plurality of chambers, usually six, for the slugs. An injection mechanism operating in conjunction with the rotatable magazine would rapidly inject a slug out of a magazine chamber and into the breech of the barrel. In another method, a plurality of barrels, in alignment with a corresponding plurality of barrel openings 54 may be provided for sequentially propelling slugs into the chamber. This method would have the advantage that if a barrel should need to be repaired or replaced, the remaining barrel or barrels would continue to operate and propel slugs into the chamber without any interruption in the operation of the reactor system.

In another system, a plurality of barrel sections of relatively short length of perhaps 50–100 cm. would be fixedly mounted in a frame which is rotatable on a central longitudinal axis. Each barrel section would move into registry and alignment with the barrel 52 to sequentially position a slug in the barrel section in alignment with the barrel above the expansion chamber. Here again, failure of one of the barrel sections would not result in a shutdown of the entire reactor system since the remaining barrel sections would continue to function in positioning slugs in the remaining barrel sections into alignment with the barrel for propelling the slugs into the chamber.

Each slug is cylindrical in shape and has a slightly larger external diameter than the internal diameter of the barrel 52 so that it will be held in position in the barrel by frictional force before it is propelled into the chamber.

The barrel 52, at the bottom portion of the vessel is provided with a plurality of vent openings 102 extending over a portion of its length adjacent to the barrel opening 54. The vent openings extend through the wall of the barrel and lead into a main expansion chamber 104 and an auxiliary expansion chamber 104'. The expansion chambers extend between an exterior surface of the barrel and a surrounding main gas containment jacket 106 and auxiliary gas containment jacket 106', respectively. The combined volume of these expansion chambers should preferably be at least about 20 times the volume of the barrel which it surrounds so that a major portion of the hot expanding helium gas, of at least about 95%, used for propelling a slug through the barrel will be dissipated into the expansion chambers. A cryogenic pump, not shown, may be provided in the chambers to cool and condense the helium gas. The gas condensate is then readily withdrawn from the expansion chambers and recirculated to the helium storage and supply tank. Alternatively, and as shown in FIG. 3, the helium gas is evacuated from the expansion chambers 104 and 104' through an opening 110 in each jacket and returned to the helium storage and supply tank 92 through a return conduit 108. A vacuum pump 112 is connected in the conduit 108 for the continuous evacuation of the expansion chambers and barrel 52.

A rotatable or slidable plate 114, of the same construction as the main plate 90, is preferably provided between the gas containment jackets 106 and 106'. Thus, the auxiliary expansion chamber 104 is of a relatively short length extending between the plates 90 and 114 while the main expansion chamber 104 is of a relatively long length extending partway between the auxiliary plate and the accelerating mechanism 50. The auxiliary plate 114 is shown in a position where an opening 116 in the plate is out of alignment with the barrel 52 to thereby isolate and seal the auxiliary expansion chamber 104' from the main chamber 104. In the operation of the slug accelerating mechanism 50 and before a slug is accelerated to the desired velocity by the expanding helium gas in the expansion chamber the main and auxiliary plates 90 and 114 are both in an open position so that the openings 92 and 116 in the plates are in registration with the barrel 52 and barrel opening 54. As a slug, here shown by reference character B, passes the auxiliary plate 114, an actuator 116 moves the auxiliary plate to the closed position, as illustrated in FIG. 3, to seal the auxiliary expansion chamber 104' from the main expansion chamber 104. The rapidly expanding helium gas in the barrel 52 is vented through the vent openings 102 into the main expansion chamber 104 to be evacuated by vacuum pump 112 and to be returned through conduit 108 to the helium storage and supply tank 92. The helium gas is repressurized, cooled and stored in the storage tank for re-use in propelling additional slugs into the chamber.

As the slug B continues to travel through the barrel, it passes through the opening 92 in the main plate 90 and is propelled through the barrel opening 54 into the chamber. At the instant the slug B passes the main plate 90, the actuator 116 moves the main plate 90 to the closed position. The chamber 14 is therefore sealed by the main plate at the instant of an explosion in the chamber.

The main plate 90 is moved by the actuator 116 to an open position immediately following an explosion in the chamber 14 while the auxiliary plate 114 remains closed for a short interval after an explosion. Solid and liquid materials such as the working fluid and radioactive debris from the exploded slugs as well as gaseous materials such as helium gas which enter the barrel between the plates 90 and 114 at the instant that the main plate 90 is opened, are expelled through the vent openings 102 into the auxiliary expansion chamber 104'. A branch conduit 118 extends from the opening 110 at the lower part of the auxiliary expansion chamber 104' to a separator 120 in which the solid and liquid materials are separated from the gaseous materials. The vacuum pump 112 is connected by conduit 108 to the separator 120 for continuously withdrawing the helium gas from the separator and for returning the helium gas to the storage tank 92. The working fluid and radioactive debris from the exploded slugs are recirculated to the main reservoir 16 or directly to the slug manufacturing station 100 through a conduit 122 leading from the separator 120.

The length of the auxiliary jacket 106' between the plates 90 and 114 is about one-tenth the length of the main jacket 106 since the auxiliary expansion chamber 104' is primarily intended for the purpose of removing the solid and liquid materials which have fallen into the barrel opening 54 and for evacuating gaseous materials from the chamber 14. Helium gas escaping past the auxiliary plate 114 during the time that the slug B is propelled through the opening 116 in the auxiliary plate 114 and during the time that the main plate 90 is moved to the closed position is also evacuated from the auxiliary expansion chamber 104'. Immediately following the removal of solid, liquid and gaseous materials from the auxiliary expansion chamber, the auxiliary plate 114 is moved by the actuator 116 to the open position in preparation for propelling the next slug into the chamber. During that time, the vacuum pump 112 continues its operation to evacuate additional amounts of gaseous materials including helium, krypton and xenon, and alkali metal vapors from the chamber 14. Accordingly, substantially all of the helium gas used for propelling slugs in continuously evacuated from the barrel 52 and chamber 14, except for trace amounts which are entrained in the working fluid and which are drained out of the chamber into the sump 72, through the expansion chambers 104 and 104' so that there is never more than a residual amount of the helium gas in the chamber to conduct the undesired transmission of shock waves to the walls of the chamber.

The closure mechanism at the top of the vessel is substantially of identical construction as the closure mechanism at the bottom of the vessel. However, since gravity causes the solid and liquid materials to fall to the bottom of the vessel, only trace amounts of these materials in the form of dust, spray or vapor will enter the barrel opening 54 or the barrel 52. Accordingly, the auxiliary plate 114 can be omitted and, instead, a single gas containment jacket 106 can be provided for the evacuation of these materials and gases out of the chamber 14 and the barrel 52. Any helium gas so withdrawn is separated from other radioactive gases and solid or liquid materials and returned to the helium storage tank 92.

It is important to note that the accelerating mechanism 50; the closure mechanism including the actuator 116, the sliding plates 90 and 114, and the gas containment jackets 106 and 106' are all positioned externally of the vessel. Thus, all of these components can be used for a practically unlimited number of times and until such time as natural wear and tear requires replacement of any of these components. Accordingly, the only component of the reactor system which is subject to the effects of the explosions is the vessel itself and the main sliding plates 90 at the opposite ends of the vessel. These are, however, designed with a safety factor to assure safe performance for a virtually unlimited number of explosions.

The following parameters in the operation of the present reactor system are selected for illustrative purposes and can be suitably varied without detracting in any way from the overall operation of the system. Accordingly, with the reactor system operating on a 6 second cycle, that is, with an explosion taking place every 6 seconds and with the slugs traveling at a speed of 100 m/sec. as they approach interception near the center O of the vessel, the operation of the reactor system is somewhat as follows. At the beginning of the cycle, or at 0 seconds, the slugs are accelerated at about 50 m/sec$^2$. At 2.0 seconds, the auxiliary sliding plates 114 are open and the slugs have reached the desired velocity of about 100 m/sec. Of course, the slugs no longer accelerate once they pass the vent openings 102 in the barrels 52. At about 2.02 seconds, the slugs pass the auxiliary plates 114. At 2.04 seconds, the slugs pass the main plates 90 and the auxiliary plates 114 begin to close. At 2.06 seconds, the main plates 90 begin to close and the slugs enter the chamber at about 12 meters from the center O. The main and the auxiliary plates will be closed at the instant of the explosion which takes place at 2.18 seconds. At about 3.2 seconds, the main plates 90 are opened to evacuate solid, liquid and gaseous materials from the chamber 14 and through the barrel openings 102 and the auxiliary expansion chambers 104'. The fission products produced by the explosion include gases such as krypton (Kr) and xenon (Xe), volatile fission products such as Rubidium (Rb) and Cesium (Cs), and microscopic particles of actinides. These explosion products are separated from the working fluid and the helium gas in the separator 120 by methods well known in the art and will not be described in further detail.

During the time interval that the main plates 90 are opened at 3.2 seconds and the end of the cycle at 6 seconds, the working fluid is allowed to drain out of the chamber through outlet openings 70 into the catch basin 72, new slugs are inserted into the breech of each barrel 52, and helium gas is charged into the expansion chambers in the accelerating mechanisms or into the ends of the barrels 52 in preparation for commencement of the next cycle. The outlet passageways 70 are always open which means that during the entire 6 second cycle there is a continuous drainage through the passageways into catch basin 72.

In the above illustrative example, the acceleration of a slug takes place at a constant 50 m/sec$^2$ so that the final velocity of the slug at a point of interception near the center of the chamber is 100 m/sec. The advantages of a relatively low rate of acceleration of 50 m/sec$^2$ are that there are less disruptive forces acting upn the slug during the flight and that there is more time to control its acceleration. Moreover, less helium gas from the accelerating mechanism will enter into the chamber. Of course, the length of the barrel will therefore be about 100 meters. If a higher rate of acceleration is used the length of the barrel and the time of accelerating the slug will be less. For example, if the rate of acceleration is 200 m/sec$^2$ the time of accelerating the slug is only about half a second for a slug velocity of 100 m/sec at the point of interception and the length of the barrel will only be about 25 meters.

The timing sequence for admission of the working fluid from the auxiliary reservoirs C,D,E,F,G,H and I into the chamber during the 6 second cycle is critical and requires accurate timing in the operation of the valves which are preferably under the control of a central computer for controlling the supply of working fluid to the passageways. Thus, the rows of valves $C_1$-$C_3$ associated with the auxiliary reservoir C and which supply the high pressure working fluid spray $C_{21}$-$C_{23}$ immediately in front of the barrel opening 54 at the top of the vessel will open in sequence. The first row of valves $C_1$ will open about 0.1 seconds before the explosion, at 0 plus 2.18 sec. while the last row of valves $C_3$ will open about 0.115 seconds before the explosion. More specifically, as a slug commences to enter the chamber at time 2.06 seconds before the explosion, the first row of valves $C_1$ open at 2.08 sec. when expressed in terms of a 6 second cycle, while the last row of valves $C_3$ open at 2.065 seconds before the explosion. With this time sequence, a slug is allowed to pass out of the barrel opening 54 into the chamber without intercepting the sprays $C_{21}$-$C_{23}$ from the rows of passageways $C_{11}$-$C_{13}$. Although only three circumferential rows of passageways $C_{11}$-$C_{13}$ are shown, it will be understood that a greater number of rows of passageways can be provided in order to obtain the desired amount of working fluid in this area of the vessel. It will also be noted that the row of valves $C_3$ open before the row of valves $C_1$ since the distance from the end of the passageways $C_{13}$ to the major longitudinal axis of the vessel is greater than the distance from the end of the passageways $C_{11}$ to the major central longitudinal axis of the vessel.

The rows of valves $D_1$-$D_4$ asociated with the auxiliary reservoir D operate in a similar sequence. Thus, the inner or uppermost row of valves $D_1$ open at 0.13 seconds before the explosion, preceded by valves $D_2$ at 0.15 seconds; valves $D_3$ at 0.18 seconds and, valves $D_4$ at 0.23 seconds before the explosion. Accordingly, in a 6 second cycle and with the explosion taking place at time 2.18 seconds after commencement of the cycle, the inner row of valves $D_1$ open at 2.05 seconds while the outer or lowermost row of valves $D_4$ open at 1.55 seconds after commencement of the cycle.

The row of valves $E_1$ associated with auxiliary reservoir E and connected to the row of passageways $E_{11}$ which produce the tubular shaped curtain $E_{21}$ of falling working fluid extending from the top to the bottom of the chamber, is opened for the longest duration of time in the 6 second cycle. Thus, the row of valves $E_1$ are opened at 0.18 seconds in the 6 second cycle or 2 seconds before the explosion and are held open until 0.12 seconds after the explosion which would be time 2.3 seconds in the cycle. The row of valves $E_2$ would open 1.65 seconds before the explosion and would remain open until 0.9 second before the explosion. The duration of time in which each of the following rows of valves $E_3$-$E_5$ are open is progressively shorter such that the last row of valves $E_5$ would open at 1.4 seconds before the explosion and closes at 1.2 seconds before the explosion. With this sequence, the successively shorter tubular curtains of working fluid are obtained to form the somewhat spherical pattern of working fluid at the center O of the chamber.

The above description is illustrative of one possible method by which a concentrated pattern of working fluid can be obtained near the exploding slugs. Although the working fluid is allowed to flow through the passageways by gravity, this invention can also be practiced whereby the working fluid is placed under a positive pressure such as by the application of a pressurized gas or by the application of a piston to a restricted fluid. The means for carrying out these method are well known and employed, for example, in the field of fuel injection in diesel engines. Of course with such non-gravity injection methods, the spray for the spherically shaped concentration of the working fluid at the center of the vessel could come from all directions of the ellipsoidal vessel. Care must be taken however that the injected spray does not interfere with the flight path or trajectory of the concurring slugs.

The wall of the chamber may additionally be protected from the explosions by opening the valves $E_2$-$E_5$, 0.1 second before an explosion and by closing the valves 0.05 seconds after the explosion. Likewise, the valves $C_1$-$C_3$ and $D_1$-$D_4$ remain open until 0.05 seconds after the explosion. Such after-explosion spray from the passageways $C_{11}$-$C_{13}$; $D_{11}$-$D_{14}$; and $E_{11}$-$E_{15}$ will further diminish the effects from the rising fireball of an explosion.

To protect the walls from the shock-blast of an explosion, the valves $F_1$, $G_1$ and $H_1$ are opened 0.5 seconds before and are closed 0.1 seconds after the explosion.

The valves connected to the auxiliary reservoir I operate in a similar manner. The row of valves $I_1$ are opened first and are allowed to remain open for a longer period of time. Specifically, the rows of valves $I_1$ and $I_2$ are opened at 0.2 seconds before the explosion and with a velocity of the working fluid of about 3 m/sec. the working fluid is sprayed into the chamber for a distance of about 0.6 meters. The working fluid which is supplied to the row of passageways $I_{13}$ at higher pressure is sprayed at a velocity of about 10 m/sec. toward the major longitudinal axis of the chamber and at a time 0.09 seconds before the explosion.

The practioner of this invention can easily vary the timing of the working fluid injections and adapt the operation of the system as conditions warrant. By the same token, the size of the vessel wall and the number and sizes of the conduits can also be varied.

With the present reactor system, the working fluid is injected into the chamber to obtain maximum attenuation of the explosions and thus maximum protection of the vessel wall, projection 62, and main sliding plates 90.

Since the hot working fluid is highly radioactive and concentrated in greater quantities at the bottom of the vessel and especially in the trough 60, a neutron absorbing liquid such as molten lithium is circulated through the chamber wall at the bottom of the vessel. Similar neutron absorbing circulating systems may also be provided in other portions of the wall. Neutron absorbing liquids such as a slurry of depleted uranium in molten sodium or a solution of depleted uranium such as uranyl sulfate or nitrate can also be used. Referring to FIG. 3, it will be noted that the bottom portion of the vessel is provided with a spiral passageway 130 extending through the chamber wall. The neutron absorbing liquid is introduced into the uppermost turn of the spiral passageway through an inlet opening 132 and flows through the spiral passageway 130 from the uppermost loop to a lowermost loop and out of an exit opening 134. The liquid is conducted from the exit opening 134 through a conduit 139 to a heat exchange coil 142 positioned in a heat exchanger 140 and returned through a conduit 138 to the inlet opening 132. A pump 136 is connected in the conduit 138 for continuously circulating the liquid through the spiral passageway and the heat exchanger 140. A heat exchange fluid passing through a secondary heat exchange coil 144 in the heat exchanger 140 is heated and used to perform useful work. Alternatively, the secondary coil 144 can be connected to the conduits 80 in the primary heat exchanger 76. The liquid passing through the coil 142 is thus continuously cooled in the heat exchanger. A drain conduit 150 is connected to the conduit 138 to allow for the periodic draining of the liquid. The drain conduit 150 is provided with a valve 152 to permit drainage of the liquid from the system. A supply conduit 154 is connected to the conduit 138 to allow for the introduction of fresh liquid to the system. A valve 156 is connected in the conduit 154 to allow for the introduction of fresh liquid to the system.

If lithium is used as a neutron absorbing liquid, helium and tritium are produced in the liquid. The helium and tritium can be separated from the lithium in a separator facility by methods well known in the art. If a slurry of depleted uranium in sodium is used the separator facility can process the irradiated uranium for fission products and plutonium. Pumping of a slurry presents a greater problem and care must be exercised so that the slurry is maintained fluid enough so that blockage does not develop in the conduits or in the spiral passageway. The fluidity of the slurry can be monitored by sensing devices such as are in everyday use today in the monitoring of chemical slurrys.

The purpose of the circulating neutron absorbing and cooling fluid is to absorb neutrons that would otherwise be lost or reflected back into the chamber and to lower the "k" near the wall so that there is a reduction of fissioning within the working fluid near the wall. The advantage of this reduction of fissioning is that a lower breeding ratio is obtained if the actinide fissioning occurs where the neutrons are more moderated prior to fissioning than is the case in the central portion of the chamber.

A plurality of systems similar to the neutron absorbing system described above can be provided throughout the wall 12 and also in wall portions in the sump 72; heat exchanger 76 or reservoir 16. These neutron absorbing systems are not only for the purpose of absorbing neutrons and for cooling the walls of the reactor system components but also absorb neutrons so that the quantity of fissioning is greatly reduced. For example if the "k" is 0.70 twice as much fissioning takes place in the working fluid containing actinides as compared to a working fluid having a "k" of 0.40. Since the slurry and precipitate will generate heat from the radioactive decay of fission products and delayed neutrons, it is desirable to lessen the heat producing fissioning in the wall of the vessel, the sump 72, the heat exchanger 76 and the main reservoir 16. Of even greater import is the reduction of fissioning in the slug manufacturing station 100 and in the accelerating mechanism 50.

Microscopic actinide particles from exploded slugs are collected and compressed in a mold in the slug manufacturing and assembly station 100 and reused as new slugs in subsequent explosions. Accordingly, the particles which are contained in suspension within the working fluid and which leave through the outlet passageways 70 at the bottom of the vessel can be separated and withdrawn from the working fluid at several locations in the reactor system. Thus, a particles trap 164 is provided in the reservoir 16 and similar traps 165 and 166 are provided in the heat exchanger 76 and in the catch basin 72. The particles entrained in the working fluid settle to the bottom of the traps where they are collected and periodically withdrawn through conduits 168, 170 and 172 connected to the bottom of each trap. A common collecting conduit 174 conducts the particles to the slug manufacturing station 100. A valve 167, 169 and 171 is provided in each conduit 168, 170 and 172 to allow for the withdrawal of such particles at desired time intervals.

A common gas outlet conduit 160 is provided for withdrawing residual gases, primarily inert gases entrained in the working fluid, from the top of the heat exchanger 76 and catch basin 72. The conduit 160 is connected to the separator 120 for processing.

The vessel 10 and other major components of the reactor system such as the reservoirs, conduits heat exchanger, and the like, must be enclosed within a protective retaining structure, not shown, similar to the structures now employed in conventional nuclear reactors. A pre-stressed spherical containment structure would be preferable for a reactor system using a single pressure vessel since such a structure would lend itself to the separation of safeguard equipment, emergency power supplies, and the like. In a reactor system having a plurality of pressure vessels, a single large cylindrically shaped retaining structure would be preferable.

Although the slugs A and B, illustrated in FIG. 1, are shown to be of the same size, this invention can also be practiced where one slug is larger than the other slug. The reactor system can also be adapted so that one of the accelerating mechanisms would propel one of the slugs at a higher velocity than the other slug provided, of course, that the slugs meet near the center of the chamber. This invention can also be practiced wherein a slug is allowed to fall by gravity through the barrel 52 having a slightly larger internal diameter than the external diameter of the slug so that the free falling slug would be guided through the barrel with little friction. In this method the slug accelerating mechanism for the slug is but a long shaft attached to the top of the vessel through which the slug falls until it reaches the chamber. A shaft having a length of about 490 meters would provide a final velocity of about 98 m/sec. and the complex shutter mechanism can be omitted.

With liquid sodium as the working fluid, the atmospheric pressure within the chamber 14 will be less than 1 mm. of mercury at the time the slugs enter the chamber so that no serious consideration need be given to the aerodynamic stability or design of the slugs. However, if a slight variation in the flight path of the slugs should occur, even a lateral displacement of the slugs at the point of interception of perhaps 1 mm. would have little effect on the magnitude of the explosion. Similarly, a timing error or a variation in the desired velocity of one of the slugs travelling toward the other slug, such that the slugs would intercept at a distance slightly above or below the intended point of interception, would have little effect on the magnitude of the explosion even if there is a displacement of as much as 15 or 20 cm. from the intended point of interception. The pressure vessel of the present invention is capable of withstanding any variation in the speed of the slugs or in their point of interception within the chamber without causing any damage to the vessel. Of course, if the slugs should fail to meet perhaps by reason of one of the slugs disintegrating before interception, no explosion would take place at all and the debris from the slugs would merely be flushed out of the chamber with the working fluid through the outlet passageways 70. The reactor system would thereafter continue to operate in a normal manner. With a computerized electrical control system, any malfunctioning of the reactor system is highly unlikely since the reliable operation of similar or more complex industrial systems under the control of a computer is well within the capabilities of the present state of the art.

In FIG. 4 there is illustrated a detail cross-sectional view of a cylindrically shaped slug 200 for use in the vessel of the present invention. The slug 200 has a diameter of about 30 cm. and a height of about 16 cm. Although the diameter of a slug is more or less fixed by the mechanical construction of the accelerating mechanism 50 or the size of the barrel 52 through which a slug is propelled, the height and the volume of the fissile-fertile material in the slug may be varied if it is desired to increase or decrease the yield or the amount of energy released by an explosion. The concentrations of different actinides within the fissile-fertile material can also be varied or the velocity of the slugs can be increased or decreased if it is desired to increase or decrease the magnitude of an explosion. Of course, the concentration of actinides within the fissile-fertile material must be maintained within the safety limits of the vessel and support equipment so as to prolong the life of this equipment over as long a period of time as possible.

Each slug 200 is formed of a major cylindrical component 204 of a metal or metal alloy. If sodium is used as the molten metal working fluid than the cylindrical component is made of sodium. The sodium should be substantially free of insoluble materials in suspension and of dissolved metals such as rubidium or cesium. Sodium of a greater purity could be obtained by distillation but such processing would be more expensive and would therefore not be as economical. The primary function of the cylindrical portion 204 is to reflect fast neutrons back into the fissioning fissile-fertile material and to act somewhat as a tamper on the explosion.

The forward or frontal portion of the cylindrical slug 200 is provided with a hemispherical portion 202 having a radius of about 12 cm. The hemispherical portion is formed of a compressed material which was collected as a precipitate from the working fluid containing the debris from previously exploded slugs. The composition of the material in the hemispherical portion 202 is about 70% uranium, 28% plutonium and the balance of 3% comprising other actinides, fission products, sodium, and a trace of corroded material from the wall of the vessel or from the conduits, heat exchanger, reservoirs or catch basin.

The hemispherical portion 202 is positioned centrally of the cylindrical portion 204 so that its flat face 206 is flush with a flat frontal surface 208 on the cylindrical portion 204.

The manufacture of the slugs in the slug manufacturing station 100 is performed automatically and by remote control since the slug materials are highly radioactive. Thus, the manufacture of the slugs can be performed in three basic steps, as follows:

1. Forming of the cylindrical alkali metal portion 204 by conventional molding or casting techniques. The cylindrical portion 204 is provided with a hemispherical recession or indentation in the frontal surface 208 corresponding in size to the hemispherical portion 202;
2. Forming the hemispherical portion 202 by pressing the collected precipitate in a mold such as is conventionally done with metal powders, and
3. Inserting the hemispherical portion 202 into the indentation in the cylindrical portion 204. The metal of the cylindrical portion is maintained close to the melting point so that the metal will be soft enough to cause bonding between the metal of the cylindrical portion 204 and the hemispherical metal portion 202.

In addition to acting as a neutron reflector and as a tamper, the metal of the cylindrical portion 204 provides a lubricating medium by which a slug is more readily able to pass through a barrel 52. Since metals such as lead, sodium, lithium, or a sodium-lithium alloy, are of a soft and non-abrasive composition, no damage will be done to the barrel as the slugs are propelled into the chamber. The slugs are formed of a size so that they "fit" into the barrel so that as little as possible of the propelling helium gas will escape between the slug and the barrel yet without retarding movement of the slug through the barrel.

Another embodiment of a slug 210 is illustrated in FIG. 5. In this embodiment, the rear portion of the slug need not be provided with a flat surface. Accordingly, the slug has a part-cylindrical configuration in which a cylindrical portion 211 of about 4 cm. in length is provided as a guide surface for the slug as it is propelled through the barrel. The remaining rear portion 213 of the slug is part-hemispherically in shape having a radius of about 15.5 cm. A hemispherically shaped portion 212 having a radius of about 12 cm., formed from a compressed material of the same composition as the portion 202 in the slug of FIG. 4 is positioned centrally of the cylindrical slug portion 211 such that the flat front face 218 of the hemispherical portion 212 is flush with a flat front face 220 on the part-cylindrical portion 214 to thereby form a combined flat surface. The slug 210 is constructed in the slug manufacturing station 100 in substantially the same manner as the slug 200 of FIG. 4.

The following illustrations are presented for help in understanding the broad general principles and it is recognized that in actual practice, different values can be applied.

If each of the concurring slugs has a velocity of 200 m/sec. the slugs are approaching each other at about 0.4 mm per micro-second.

Since there are about 11 kg of Pu-240 within the combining slugs and about 1,000 neutrons per second are produced from each gram of Pu-240 by spontaneous fissioning, and there are neutrons from the spontaneous fissioning of other actinides roughly 12 neutrons will be produced every micro-second. If the prompt "k" of the combining slugs is 0.99 there is a multiplying effect of about a hundred times. Accordingly, as the slugs approach each other much fissioning takes place and many neutrons are being produced even though the combining slugs are not prompt critical.

Very rough and simplified calculations show that at the instant the slugs become prompt critical there are about $10^4$ fissionings per "generation" of about 20 nanoseconds. After about 15 micro-seconds the prompt "k" is say 1.07 and over $10^{16}$ fissionings will then be occurring per "generation". At such time the energy from such fissioning will cause the slugs to begin to vaporize and explode. Then the "k" begins to decline even though the slugs are still concurring. Even so the rate of fissioning continues to rise for a couple more microseconds.

As the combining slugs are dissipated or exploded, the "k" falls below 1.00 and the rate of fissioning rapidly declines. Because of delayed neutrons, fissioning will continue even though the debris from the exploded slugs is now entrained within the working fluid in the chamber. Say that about 10 milli-seconds after the explosion in the centroidal 100 cubic meters of the chamber the "k" is about 0.5 and that means that the neutrons will be doubled within that centroidal portion.

The reactor system is designed to contain an explosion with an energy burst of about $4 \times 10^{10}$ joules in say a milli-second and have an additional $8 \times 10^9$ joules of energy from energy of delayed neutron fissioning and radio-active decays. All this energy comes directly or indirectly from the fission of about 0.6 grams of actinides which is about $1.5 \times 10^{21}$ fissionings. Less than four actinide atoms of a million atoms of the combined slugs fission. It will also be readily apparent from the preceding description of the slugs that they are most unsuitable as components in atomic weapons. Present day atomic explosives have an efficiency (fraction of actinide atoms fissioned) that is perhaps 10,000 times greater than the slugs of this invention. Although the fission explosions obtained with the slugs of the present invention are of an extremely low yield, it is so intended for reasons to be explained subsequently.

If the slugs are propelled to attain a velocity which is the minimum of the normal or intended velocity for the slugs, the energy yield per cycle would be approximately $4.8 \times 10^{10}$ joules. However, if the velocity is below the minimum velocity, the combining slugs will be blown apart or dispersed before there has been enough fissioning to produce the desired quantity of energy. An explosion producing a lessor magnitude of energy presents no great loss because an adjustment in the speed of the slugs or a slight decrease in the time intervals between explosions would readily make up for the loss of energy not produced by such a "fizzle" explosion. Although a "fizzle" explosion would result in a slight increase in the costs of fabricating and accelerating an extra set of slugs, it does not represent a loss in the amount of fissle actinide materials available in the system since the debris from the "fizzle" explosion would be extracted from the working fluid and reassembled in the manufacture of additional slugs in the slug assembly station 100.

The total quantity of fissile actinide materials within the very lean sodium slurry working fluid, that is within the chamber 14 at the instant of an explosion, will be hundreds of kilograms and with about 140 metric tons of such working fluid within the chamber the "k" could be about 0.30. If the "k" were to be say 0.65 there would be about twice as much fissioning therein as with a low "k" of but 0.30. Thusly, control of the quantity of the debris in the working fluid can be used to control the magnitude of the explosions in the chamber.

The ratio of the fissile actinide material, i.e., plutonium, can readily be varied with respect to the fertile material, i.e. uranium, so that the "k" of the debris in the working fluid and in the slugs is arranged such that the desired magnitude of explosion is possible. With the various factors which lend themselves to ready change, such as the speed and composition make-up of the slugs, composition and quantities of actinides in the slurry, and of the total actinide mass of the slugs, explosions producing the desired quantity of total energy can be obtained. Likewise, explosions of greater than desired magnitude can easily be avoided.

An advantage of the present reactor system over the liquid sodium cooled, fast neutron reactors now in use is that no cladding material which moderates and absorbs neutrons, is needed. Much of the fissioning which takes place in the explosion of slugs in the present invention occurs without any of the neutron absorbing and neutron moderating working fluid being present. Only after most of the fissioning has taken place, do the actinide materials mix with the working fluid to form a slurry. There are no oxygen atoms to moderate the fission-born neutrons. It is expected that over 20% of the fissioning will be the fast neutron fissioning of Uranium-238. This is higher than what can be obtained with a sodium cooled breeder reactor. There will be more neutrons from each fissioning because there are more neutrons per fission from fast neutron fissioning than from slower neutron fissioning. For example, thermal neutron fissioning of Pu-239 yields an average of 2.89 neutrons per fission, 1.3 Mev neutrons yield 3.08 neutrons, and 4.0 Mev neutrons yield 3.43 neutrons per fission.

Also with fast neutrons there tends to be a higher ratio of fissionings to capture and this is particularly true with such neutron absorbing isotopes as $Np^{237}$; $Pu^{240}$ and $Pu^{242}$ all of which are fissionable by fast neutrons.

With a concentration of debris in the working fluid having a higher "k", the energy produced by delayed neutron caused fissioning will be significant. Fissioning $Pu^{239}$ has 0.21% delayed neutrons while fissioning $U^{238}$ has 1.57% delayed neutrons. For example, $I^{137}$, which has a half life of 22 seconds and which decays by neutron emission, produces 0.215% of the neutrons from $U^{238}$ fissioning and 0.063% of the neutrons from $Pu^{239}$ fissioning.

By far the most important isotope breeding reaction of this embodiment is the following series of nuclear transformations:

$$n + U^{238} \longrightarrow U^{239} \longrightarrow Np^{239} \longrightarrow Pu^{239} \qquad (1)$$

half lives: 23.5 minutes; 2.35 days; 24,400 years

Accordingly, fuel for the manufacture of additional slugs for use in the reactor system of the present invention is bred. Since the system produces an excess in fuel, such additional fuel can be used either in conventional reactors as a "plutonium re-cycle" or in other new reactors of this invention.

In a further modification, the composition of a slug could contain actinides which are undesirable in nuclear reactors in use today. For example, $Np^{237}$ is produced by the faster neutron stripping of an extra neutron from $U^{238}$ and the subsequent decay of $U^{237}$. Thus, in present day reactors $Np^{237}$ will capture a neutron and $Np^{238}$ will decay into $Pu^{238}$ which will most likely capture another neutron before it fissions to produce Pu$^{239}$. However, with the very fast neutrons produced in the explosions of the reactor of the present invention, it is expected that Np$^{237}$ will fission rather than become Np$^{238}$. Moroever, in the explosion itself there is the likelihood that Np$^{238}$, with a half-life of 2.1 days, will fission with its very high fission cross-section. Likewise, Pu$^{238}$ is more likely to fission rather than to absorb a neutron. In other words, Neptunium can be used as a fissile material in the slugs of the present invention.

As a further alternative, thorium can be used as fertile material in the slugs of the present invention. Although thorium is less likely to fission to fast neutrons than is U$^{238}$, thorium will react and decay when irradiated by neutrons, in accordance with the following reactions:

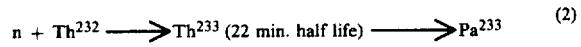

After the reactor has been in operation for a time and after a predetermined number of explosions, the actinides are processed and protoactinium is isolated by methods not specifically described in the present application since they are well known in the art. The protoactinium decays, after several months, to form uranium which will be rich in the most fissile isotope U$^{233}$. In other words, the materials making up the hemispherical portions 202 and 212 can be designed to contain plutonium, thorium and uranium containing isotopes 232, 233, 234 and 238. The protoactinium produced in the explosion when thorium containing slugs are used can be isolated and removed by methods well known in the art.

Although there are many possible variations in which thorium can be used as a fertile material to produce U$^{233}$, the system described in the preceding paragraph is preferred because high-purity (uranium)u 233 is obtained and more fast fissioning of fertile isotopes is produced than would be the case if only fertile thorium were used. In other words, the net input in this (thorium) embodiment would be 44 thorium atoms and 82 depleted uranium atoms and the net output would be the fission products from 100 fissionings, 1 atom of (protactinium)Pa-231, and 25 atoms of U$^{233}$. Note that most of the fissioning is of plutonium which was bred from depleted uranium. The easily isolatable U$^{233}$ is much more valuable for slow neutron reactors than is plutonium.

In order to operate the system of the present invention as economically as possible, there will be less processing of the working fluid and precipitate for fission products and hence a larger build-up of fission products in both the working fluid and the re-processed slugs. This will, in effect, reduce somewhat the breeding ratio, but calculations indicate that for every 100 fissions of actinides there will be produced about 16 atoms of Pu$^{239}$; 7 atoms of Pu$^{240}$; 4 atoms of Pu$^{241}$, 2 atoms of Pu$^{242}$, and one other atom of some other actinide isotope in excess of those needed in the operation of the reactor system. One hundred and thirty depleted uranium atoms will be the net input in this illustration of the preferred or "depleted uranium" embodiment of this invention.

In the practice of the preferred embodiment of this invention the exact mass of actinides, the fractions of fissile and fertile actinides therein, and the "k" of the slurry should so be adjusted that the two concurring slugs near the center of the chamber 14 when substantially surrounded by spray-slurry become a more than prompt-critical assembly when their front surfaces are about one centimeter from each other.

If the single slug after manufacture is tested in the sub-critical mode, by means known to those skilled is such arts, and is found to be too low in fissionability for the above conditions to be met, it could be programmed to be paired-explosionated with a slug that is of higher fissionability but not close to prompt-criticality by itself. The fissionability of a slug can most easily be adjusted by changing the percentage of plutonium in the portions 202 or 212. Also the size of the portions 202 or 212 can be changed. For example, the radius r could be as small as say 11 cm or as large as say 13 cm without necessitating any change in the sizes of the slug accelerating means. As there is a build-up of fission products and an increase in the percentage of fissile actinides therein, such changes would be needed. Note that to decrease the fissionability of slugs with a fixed size portions 202 or 212 some more uranium could be added to the materials used to construct such portions.

The uranium used for the practice of this invention might be depleted uranium which is about 0.2% uranium-235 and over 99.7% uranium-238. Such depleted uranium is in great over-supply and is priced at about 3% of the price of natural uranium. Also, uranium from spent enriched light water reactor fuel assemblies could be used. Such uranium averages about 0.8% uranium-235, about 0.2+% uranium-236, and about 98.9+% uranium-238. It should be noted that with such uranium there would be more fissioning of uranium-235 and there would be more production of neptunium-237 that with depleted uranium. It should be noted that uranium-236 has larger cross-sections for fissioning and fissions to slower neutrons than does uranium-238.

Perhaps the best source of plutonium for use in the practice of this invention would be the plutonium from spent fuel of "plutonium re-cycle" where the plutonium isotopes Pu-238, Pu240 and Pu-242 are of much higher percentages.

For the best breeding of isotopes or for less wear on the reactor it is desired to have a minimal fraction of actinides in the lean sodium slurry which is the working fluid. From the figures shown hereafter the atomic percent of actinides within the slurry is about 0.20% while the weight percent of actinides is about 2.07%. Such a slurry is harder to pump and is more corrosive and/or erosive upon the passageway wall, etc. than is purer molten sodium. Also, the larger the quantities of actinides within the slurry the greater the fractional proportion of fissionings within the slurry. A larger fraction of fissionings with the slurry will result in a lower breeding ratio and in greater undesireable irradiation of the chamber 14's walls by both neutrons and gamma rays.

However, the use of a leaner lean slurry would require more time for precipitations and a larger inventory of actinides and sodium. Hence there would be a longer doubling time and greater tool expense for the construction of larger storage basins 16, etc. Also the slugs would have to be made slightly more fissionable.

Although the plutonium can be withdrawn and used in other types of fast neutron reactors or in a reactor using a "plutonium re-cycle" the best use of the material bred in the reactor system of the present invention is to use the fissile material in another reactor system of this invention. With rapid precipitation and fabrication of slugs a "doubling time" of but a couple of years can be obtained. Such quick processing means that some delayed neutrons will be emitted within the fabricated slug. For example, nine minutes after fissioning from a hundred million fissionings, about 22 delayed neutrons will still be "born".

The effects of a nuclear explosion within the chamber 12 may be summarized as follows:

1. The heat flash from an explosion is attenuated by the metal working fluid which is mixed with the debris from previous explosions so that substantially none of the heat flash produced by the explosion will reach the wall of the vessel.
2. The shock-blast of the explosion is, to a great extent, attenuated by the inertia of the working fluid which is injected into the chamber and by the lack of an atmosphere within the chamber.
3. Neutrons are absorbed by the working fluid itself and by the debris in the working fluid to moderate and absorb neutrons. On the average the fission-born neutrons will need to make more than 200 collisions with the atoms within the chamber before their energy level is low enough so that capture by sodium becomes probable. With about 10,000 atoms of sodium, there is about 12 atoms of $U^{238}$, about 5 atoms of plutonium, and a balance of about 3 atoms of magnesium from neutron irradiated sodium, wall materials, fission products, or other actinide isotopes. Most of the near-thermalized neutrons will be captured by $U^{238}$ which will eventually decay into $Pu^{239}$. More neutrons will fission plutonium than will be captured by plutonium and still fewer neutrons will be captured by sodium or other isotopes. Few neutrons will reach the wall of the vessel and most of those neutrons which do pass through the working fluid to irradiate the wall are delayed neutrons or neutrons from fissioning that was caused by delayed neutrons. Over an extended period of time, the wall will become radioactive, but with a careful selection of materials which are resistant to neutron irradiation, damage to the wall will be negligable.
   As has been previously disclosed a plurality of neutron absorbing systems are provided within the wall. Accordingly, few neutrons will be absorbed by the wall itself and less fissioning will occur near the wall so that fewer neutrons will cause neutron irradiation of the wall.
4. Most of the slug material and of the nearby working fluid is "plasmatized" (a majority of the atoms are ions). These, more active chemical ions, are "neutralized" by the injection of an additional quantity of working fluid into the chamber so that there is a minimal corrosion of the wall by such ions.

The reactor system of this invention can be used for the prdocution of isotopes useful in fusion reactions as well as the production of fissile isotopes. For example, if lithium is used as the working fluid, tritium will be produced from the reaction:

$$n + Li^6 = T + He^4 + 4.8 \text{ Mev}. \tag{3}$$

Tritium is radioactive and with a half-life of 12 years decays into Helium-3. Both tritium and $He^3$ are usable in fusion reactions.

Natural lithium contains 7.4% lithium-6 which has a thermal neutron cross-section for the $Li^6(n,T)He^4$ reaction of 950 barns and contains 92.6% lithium-7 whose thermal cross-section for the $Li^7(n,T)Li^8$ is a very low 0.036 barns. Lithium-8 has a half-life of 0.85 seconds and decays into beryllium-8 which, after a half life of $10^{-16}$ seconds, fissions into two helium-4 atoms.

Lithium as a working fluid has advantages over sodium in that it has a much lower vapor pressure and a much higher specific heat. The heat of vaporization for lithium is more than 4700 calories per gram. However, lithium is more of a moderator and to some metals is more corrosive than sodium.

If lithium-7 metal (depleted lithium) is used, it would have a few reactions to very fast neutrons:

$$n + Li^7 \rightarrow Li^6 + 2n \text{ (slower)} \tag{4}$$

$Li^6$ from reaction (4) would produce tritium and helium by the reaction (3). With lithium-7 as the working fluid very little tritium would be produced and that tritium could remain within the working fluid as lithium (tritide). Over a period of time, tritium will decay into helium-3 which is easily separated and collected as a gas.

Helium-3 with its very high cross-section to thermal neutrons of 5500 barns can find use as a very rapidly moving reactor control gas. (At 2352° K., $He^3$ has an average velocity of about 7000 meters per second). Also it can be used as a fuel for the fusion reaction:

$$D + He^3 \rightarrow H + He^4 + 18.3 \text{ Mev} \tag{5}$$

Both of the products are as ions and with certain types of conversion systems would be much desired over fusion reactions that produce neutrons.

If natural lithium is used, great quantities of tritium would be produced in the reactor system of the present invention. Those skilled in the art can find much discussion in current literature as to how tritium can be separated from molten lithium. The use of lithium as the working fluid would lower the "k" of the actinides in slurry with the lithium and hence there would be a need to increase the percentage of fissile material in the slugs if the invention is to be practiced with the same parameters as with sodium.

Taking into account the high cost of lithium, however, the best means of producing tritium in the reaction system of this invention is to use an alloy of about 5% lithium in sodium. With such a molten alloy, for every thermal neutron captured by sodium there would be about 7.4 atoms of tritium produced.

The pressure vessel of the present invention can be constructed by methods which are well within the present state of the art. More specifically, the vessel could be constructed by erecting an inner "skin" of a heavy gauge steel having a thickness of about 5 to 10 cm. The skin forming the inner surface of the wall 12 could be erected by welding together a plurality of plates and by holding the plates in position by means of an interior and exterior frame. Components of the frame could be introduced to the interior of the skin though the barrel openings 54 which have a diameter of 30 cm. or through the passageways 70 which have a diameter of 40 cm. if 3 such passageways are provided. If these openings should still be too small, a larger access opening can be provided in a convenient place in the inner skin. The plates forming the inner skin are provided with a plurality of openings and a conduit of predetermined length would be attached to each opening to thereby form the passageways extending through the wall of the vessel. Additional conduits of predetermined length would be attached to the inner skin to form the outlet passageways 70 and the barrel openings 54. An outer skin of heavy gauge steel plates, forming the outer surface of the wall 12 and having a corresponding number of openings would be erected and fitted to the conduits forming the passageways to thus form a skeleton vessel having inner and outer skins with all of the conduits which form the passageways providing effective supporting struts to hold the outer skin in position relative to the inner skin.

Metal pellets or coarse granular metal particles could be poured into the space between the skins followed by the introduction of a quantity of molten metal which will flow into the spaces between the pellets or grain to form a unitary and solid wall portion. The process can be carried out by a continuous casting process in which a layer of pellets or grain is introduced into the space between the skins followed by a stream of molten metal. The process is continued until the entire space between the skins is filled to form the ellipsoidal pressure vessel. The hot molten metal when coming into contact with the inner and outer skins and the pellets or metal particles produces a welding or joining of the metals with the molten metal to thus weld the skins and pellets or grains to produce a unitary structure or wall 12. Alternatively, molten metal can be poured into the space between the skins without the use of metal pellets or grain.

Suitable supporting means such as struts support the vessel within a spherical or cylindrical containment structure which would be constructed of a thick wall of reinforced concrete in a manner similar to the containment structures which are used in present day nuclear reactors. The reservoirs may be supported upon ledges provided on the interior wall of the retaining structure or they may be supported by means of struts or supporting beams mounted on the interior wall of the supporting structure or, if space permits, on the exterior of the pressure vessel wall 12.

If a plurality of vessels are erected in a common "Nuclear Reactor Park", a common slug manufacturing station, a common debris purification system, and a common outer containment vessel can be provided. The pumps, heat exchangers, and working fluid can be arranged so that the system can be used even if one of the chambers is closed down for maintainence or repair.

It is believed that the present invention comprises a solution to the serious problems of energy shortages existing in major parts of the world today. Moreover, the present invention provides an alternative method of producing thermal energy and of providing valuable isotopes for the nuclear breeder reactors which are now under development. The nuclear explosion breeder reactor system of the present invention can be constructed by methods which are well within the state of present day technology. The reactor system is economical to operate and capable of producing energy without depleting present day resources of enriched uranium. Finally, the reactor system of the present invention is designed to breed valuable isotopes.

This invention could be practiced with larger contained explosions, with different sizes of slugs, with leaner slurry, and with a lower fraction of fissile actinides. For example, the velocity of the slugs could be such that an explosion equal to about $2.8 \times 10^{11}$ joules about every 7 seconds yields about 48 billion watts of thermal power. The slug could have a diameter of say 40 cm. and the radius r of the portions like 202 or 212 could be say 15 cm. That means that the portions like 204 or 214 would have greater tamping and neutron reflecting functions. The plutonium within the slurry and in the slugs will be about 20% of the actinides while the fraction of actinides within the slurry will be say one-half of the fraction in the preferred embodiment. Likewise, the quantities of spray and the sizes of the chamber, pumps, slug accelerating means, etc. would also be scaled upwardly. Note that other accelerating means such as the magneticly driven "mass driver" could be used. Of course these and other modifications could be made in this invention without deviating from this invention's broad concepts.

It is understood that the foregoing description is illustrative of a preferred embodiment of this invention and that the scope of the invention is not to be limited thereto but is to be determined by the appended claims.

We claim:

1. A method of generating thermal energy and isotopes in a contained fission explosion, breeder reactor system, comprising the steps of providing a pressure vessel having an explosion chamber, introducing a pair of slugs each containing a sub-critical mass of actinides into said chamber propelling at least one of said slug pair, said pairs being introduced successively and at predetermined time intervals into the chamber along a flight path where they intercept at or near the center of the chamber and where the combining slug masses become more than critical to produce an explosion injecting a major portion of a working fluid into the chamber in the form of a plurality, draining the working fluid heated by the explosion from the vessel for conversion into useful work, collecting fissile, fertile and irradiated isotopes and debris from the exploded slugs as a precipitate from the working fluid, and fabricating the precipitate into additional slugs.

2. The method according to claim 1, including the steps of injecting said major portion of the working fluid through a plurality of concentric circular rows of passageways extending through an upper wall portion of the vessel such that the working fluid flows downwardly through the chamber in concentric relationship to a major axis passing longitudinally through the center of the vessel, controlling the flow of the working fluid through at least one innermost row of said passageways to form a tubular curtain extending along the entire length of the chamber at the instant of an explosion, and controlling the flow of working fluid through the remaining concentric rows of passageways extending outwardly of said innermost circular rows of passageways to form a plurality of outer tubular curtains of decreasing length from an inner to an outermost curtain thereof, said outer tubular curtains falling through the chamber to form a substantially spherically shaped body of working fluid which is concentrated near the center of the chamber at the instant of the explosion at the point of interception of the slugs.

3. The method according to claim 1, including the steps of injecting said minor portion of the working fluid as a spray into the chamber through a plurality of circular rows of passageways extending through top and bottom wall portions of the vessel inwardly of the concentric tubular curtains and in a direction toward a major axis passing longitudinally through the center of the vessel, and controlling the flow of the working fluid through the circular rows of passageways to spray the working fluid in front of the barrel openings before an explosion.

4. The method according to claim 1, including the steps of injecting said minor portion of the working fluid as a spray into the chamber through a plurality of circular rows of passageways extending through the wall of the vessel outwardly of the concentric tubular curtains, and controlling the flow of the working fluid through said circular rows of passageways such that the working fluid is sprayed adjacent to the internal surface of the chamber wall for cooling the chamber wall.

5. The method according to claim 1, including the steps of propelling each slug through a barrel by means of a rapidly expanding propelling gas, evacuating the propelling gas from the barrel through vent openings in the barrel, and recirculating the expanded gas to a storage and supply tank for re-use in propelling additional slugs into the chamber.

6. The method according to claim 5, including the steps of evacuating from the chamber residual amounts of the propelling gas escaping from the barrels into the chamber, evacuating from the chamber gaseous and non-gaseous explosion products, working fluid and propelling gases, separating and recirculating the propelling gas from the chamber to the storage and supply tank, separating the working fluid from the explosion products and returning the working fluid to the vessel, and returning the non-gaseous explosion products for re-use in the manufacture of additional slugs, and separating and storing the gaseous explosion products.

7. The method according to claim 1, including the steps of circulating a neutron absorbing fluid through a passageway in the wall of the vessel, passing said neutron absorbing fluid through a heat exchanger for cooling the fluid and the wall, and periodically withdrawing the neutron absorbing fluid from the passageway and introducing new fluid into the passageway.

8. The method according to claim 1, including the steps of propelling a pair of said slugs through barrel openings at opposite ends of the vessel, positioning said barrel openings so that they extend along a major vertical axis of the vessel, closing said barrel openings before said pair of combining slugs explode, opening said barrel openings after the explosion, and evacuating solid and gaseous materials from the chamber through the barrel openings, and through vents in the barrel.

9. In the method according to claim 1, including the step of producing tritium by irradiation of a working fluid containing lithium.

10. In a contained fission explosion breeder reactor system for generating thermal energy and for breeding isotopes: a pressure vessel having an explosion chamber; means for injecting a predetermined quantity of a working fluid into the chamber and for heating the working fluid by a fission explosion taking place near the center of the chamber, and means for draining the heated working fluid from the chamber for use in the production of useful work, the improvement comprising a plurality of re-useable accelerating mechanisms positioned externally of said vessel, each accelerating mechanism having a barrel in alignment with a barrel opening in said vessel for propelling a slug of a sub-critical mass of actinides into the chamber along a flight path such that the slugs from the accelerating mechanisms intercept near the center of the chamber where the combining slug masses become more than critical for producing an explosion, a closure mechanism for closing each barrel after passage of a slug into the barrel opening and before an explosion means for injecting a major portion of a working fluid into the chamber in the form of a plurality of concentric tubular curtains surrounding the flight path of the slugs, means for injecting a minor portion of the working fluid in the form of a spray adjacent the internal surface of the vessel wall and in front of the barrel openings through which said slugs pass into the chamber, said working fluid being selected from the group consisting of sodium, lithium, lead, or alloys thereof, of concentric tubular curtains surrounding the flight path of the slugs, injecting a minor portion of the working fluid in the form of spray adjacent to an internal surface of the vessel wall and in front of the barrel openings through which said slugs pass into the chamber, selecting the working fluid from the group consisting of sodium, lithium, lead, or alloys thereof, means for collecting fissile, fertile and irradiated isotopes and debris from the exploded slugs, and means for recirculating and fabricating said debris into additional slugs.

11. In the system according to claim 10, wherein said pressure vessel is substantially ellipsoidal in shape having a wall which is substantially elliptical in cross-section, said barrel openings extending through the wall at opposite ends of the vessel and being in alignment with a major axis extending vertically through the center of the vessel, a projection extending into the chamber and forming a collection trough at the bottom of the chamber for collecting the working fluid, one of said barrel openings extending centrally through the projection, a plurality of passageways extending from a bottom surface in the trough through the wall of the vessel for continuously draining the working fluid from the vessel, and a sump connected to the passageways externally of said vessel for collecting the heated working fluid from the vessel.

12. In the system according to claim 11, including a closure mechanism for closing each barrel opening before an explosion, each closure mechanism comprising a closure plate having an opening, and means for actuating said closure plate for moving the opening in said plate into alignment with the barrel opening in the vessel and with the barrel for passage of a slug therethrough into the vessel.

13. In the system according to claim 10, wherein said slugs are propelled from the accelerating mechanisms through the barrels by a rapidly expanding propelling gas, a plurality of vent openings in each barrel extending over a portion of its length, a containment jacket surrounding the barrel portion provided with said vent openings and forming an expansion chamber therewith, means for continuously evacuating propelling gas from said barrel and expansion chamber, and means for recirculating said propelling gas to a gas storage and supply tank for use in propelling additional slugs.

14. In the system according to claim 11, including a closure mechanism for closing the barrel opening at the bottom of the vessel before an explosion, said closure mechanism comprising a main and an auxiliary plate each having one opening therein, said main plate being positioned between the barrel opening in the vessel and an upper end portion of the barrel, said auxiliary plate being positioned below the main plate and between said upper end portion and a lower end portion of said barrel, an actuating mechanism for sequentially opening said plates such that the openings in plates are in alignment with the barrel and barrel openings as a slug is propelled through the barrel, said upper end portion of the barrel between the plates and the lower end portion of the barrel below said auxiliary plate having a plurality of vent openings, a pair of containment jackets surrounding the barrel portions provided with said vent openings to form a pair of expansion chambers, said slugs being propelled through the barrel by means of a propelling gas, means for continuously evacuating said propelling gas through the vent openings in the barrel and from the expansion chambers, and means for recirculating said propelling gas to a gas storage and supply tank for use in propelling additional slugs.

15. In the system according to claim 11, including at least one passageway within the wall of said vessel, and means for circulating a neutron absorbing and cooling fluid through the passageway.

16. In the system according to claim 11, including a first plurality of concentric circular rows of passageways extending through an upper wal portion of the vessel for injecting the working fluid into the vessel in the form of a plurality of falling, concentric, tubular curtains of working fluid, a second plurality of circular rows of passageways extending through said upper wall portion and through a lower wall portion of the vessel inwardly of said first rows of passageways for injecting the working fluid into the chamber as a spray in front of the barrel openings, and a third plurality of circular rows of passageways extending through the wall of the vessel outwardly of said first rows of passageways for injecting the working fluid as a spray adjacent to an internal surface of the wall for cooling the wall.

17. In the system according to claim 10, wherein the isotopes generated by the explosion include $Pu^{239}$, $Pu^{241}$, and/or $U_{233}$.

18. In the system according to claim 10, wherein said slug comprises: (1) a major portion of substantially cylindrical shape formed from a metal or metal alloy selected from the group consisting of sodium, lithium and lead, said cylindrical portion having a flat frontal surface and a hemispherical depression centrally positioned in the frontal surface, and (2) a minor hemispherical portion, formed of a sub-critical mass of a fissile-fertile material, which has a flat frontal surface.

19. In the system according to claim 18, wherein the composition of the material in the minor hemispherical portion of the slug consists of a mixture of fertile and fissile actinides, said fissile actinides comprising $Pu^{239}$, $Pu^{241}$ and/or $U^{233}$.

20. In the system according to claim 18, wherein said major cylindrical slug portion opposite of said flat frontal face, has a substantially ellipsoidal rear portion.

* * * * *